(12) United States Patent
Raj et al.

(10) Patent No.: US 10,404,466 B2
(45) Date of Patent: Sep. 3, 2019

(54) SECURE HARDWARE FOR CROSS-DEVICE TRUSTED APPLICATIONS

(71) Applicant: Microsoft Technology Licensing, LLC, Redmond, WA (US)

(72) Inventors: Himanshu Raj, Sunnyvale, CA (US); Stefan Saroiu, Redmond, WA (US); Alastair Wolman, Seattle, WA (US); Chen Chen, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 212 days.

(21) Appl. No.: 15/459,593

(22) Filed: Mar. 15, 2017

(65) Prior Publication Data

US 2017/0187533 A1   Jun. 29, 2017

Related U.S. Application Data

(62) Division of application No. 14/629,501, filed on Feb. 24, 2015, now Pat. No. 9,686,077.

(Continued)

(51) Int. Cl.
*H04L 9/32* (2006.01)
*H04L 29/08* (2006.01)
(Continued)

(52) U.S. Cl.
CPC ........ *H04L 9/3234* (2013.01); *G06F 21/6272* (2013.01); *G06F 21/72* (2013.01);
(Continued)

(58) Field of Classification Search
None
See application file for complete search history.

(56) References Cited

U.S. PATENT DOCUMENTS 6,199,055 B1    3/2001   Kara et al.
7,620,707 B1   11/2009   Sutherland et al.
(Continued)

FOREIGN PATENT DOCUMENTS

| CN | 1284227 A | 2/2001 |
| CN | 1926837 A | 3/2007 |
| WO | 2013051760 A1 | 4/2013 |

OTHER PUBLICATIONS

"Office Action Issued in Chinese Patent Application No. 201580012404. 5", dated Jun. 29, 2018, 14 Pages.

(Continued)

*Primary Examiner* — Trang T Doan
(74) *Attorney, Agent, or Firm* — Medley, Behrens & Lewis, LLC

(57) ABSTRACT

Various technologies described herein pertain to a computing device that includes secure hardware (e.g., a TPM, a secure processor of a processing platform, protected memory that includes a software-based TPM, etc.). The secure hardware includes a shared secret, which is shared by the secure hardware and a server computing system. The shared secret is provisioned by the server computing system or a provisioning computing system of a party affiliated with the server computing system. The secure hardware further includes a cryptographic engine that can execute a cryptographic algorithm using the shared secret or a key generated from the shared secret. The cryptographic engine can execute the cryptographic algorithm to perform encryption, decryption, authentication, and/or attestation.

20 Claims, 11 Drawing Sheets

Related U.S. Application Data

(60) Provisional application No. 61/949,211, filed on Mar. 6, 2014.

(51) Int. Cl.

| | | |
|---|---|---|
| *G06F 21/62* | (2013.01) | |
| *G06F 21/72* | (2013.01) | |
| *G06F 21/78* | (2013.01) | |
| *H04L 9/12* | (2006.01) | |
| *H04L 29/06* | (2006.01) | |
| *H04L 9/08* | (2006.01) | |
| *G06F 21/10* | (2013.01) | |

(52) U.S. Cl.
CPC .............. *G06F 21/78* (2013.01); *H04L 9/085* (2013.01); *H04L 9/0869* (2013.01); *H04L 9/0877* (2013.01); *H04L 9/0897* (2013.01); *H04L 9/12* (2013.01); *H04L 63/0428* (2013.01); *H04L 63/0435* (2013.01); *H04L 67/1002* (2013.01); *H04L 67/1095* (2013.01); *G06F 21/10* (2013.01); *G06F 2221/0706* (2013.01); *G06F 2221/0771* (2013.01); *G06F 2221/2115* (2013.01); *H04L 2209/127* (2013.01)

(56) References Cited

U.S. PATENT DOCUMENTS

| | | | |
|---|---|---|---|
| 8,375,221 B1 | 2/2013 | Thom et al. | |
| 8,504,665 B1 | 8/2013 | Sutherland et al. | |
| 8,775,757 B2 | 7/2014 | Polzin et al. | |
| 8,839,353 B2 | 9/2014 | Thom et al. | |
| 8,913,802 B2 | 12/2014 | Han et al. | |
| 2002/0157002 A1 | 10/2002 | Messerges et al. | |
| 2005/0213768 A1* | 9/2005 | Durham | G06F 21/57 380/278 |
| 2007/0033372 A1 | 2/2007 | Everhart et al. | |
| 2008/0276301 A1 | 11/2008 | Nataraj et al. | |
| 2009/0006868 A1 | 1/2009 | Alkove et al. | |
| 2009/0193264 A1* | 7/2009 | Fedronic | G06F 21/31 713/184 |
| 2009/0216907 A1 | 8/2009 | Eastman et al. | |
| 2009/0305673 A1 | 12/2009 | Mardikar | |
| 2010/0115625 A1 | 5/2010 | Proudler | |
| 2010/0306485 A1 | 12/2010 | Dubhashi et al. | |
| 2011/0007901 A1* | 1/2011 | Ikeda | H04B 5/02 380/270 |
| 2011/0264911 A1* | 10/2011 | Hayashi | H04L 9/12 713/158 |
| 2012/0297134 A1 | 11/2012 | Parthasarathy et al. | |
| 2013/0067243 A1 | 3/2013 | Tamayo-Rios et al. | |
| 2013/0159729 A1 | 6/2013 | Thom et al. | |
| 2013/0174220 A1 | 7/2013 | Berg et al. | |
| 2014/0053227 A1 | 2/2014 | Ruppin et al. | |
| 2014/0095625 A1* | 4/2014 | Quan | H04L 67/1095 709/205 |
| 2014/0289528 A1* | 9/2014 | Baghdasaryan | G06Q 20/42 713/171 |
| 2015/0256332 A1 | 9/2015 | Raj et al. | |

OTHER PUBLICATIONS

Gilbert, et al., "YouProve: Authenticity and Fidelity in Mobile Sensing", Retrieved at: <<http://dl.acm.org/ft_gateway.cfm?id=2076759&ftid=1064282&dwn=1&CFID=381959463&CFTOKEN=56893046>>, In Proceedings of the 9th ACM Conference on Embedded Network Sensor Systems, Nov. 1, 2011, pp. 176-189.

Liu, et al., "A Cloud Architecture of Virtual Trusted Platform Modules", Retrieved at: <<http://ieeexplore.ieee.org/stamp/stamp.jsp?tp=&arnumber=5703613>>, In IEEE/IFIP 8th International Conference on Embedded and Ubiquitous Computing, Dec. 11, 2010, pp. 804-811.

Aslam, Mudassar, "Secure Service Provisioning in a Public Cloud", Retrieved at: <<http://mdh.diva-portal.org/smash/get/diva2:550493/FULLTEXT02.pdf>>, In Licentiate Thesis, Malardalen University, Dec. 17, 2012, 65 pages.

Wan, et al., "Building Trust into Cloud Computing Using Virtualization of TPM", Retrieved at: <<http://ieeexplore.ieee.org/stamp/stamp.jsp?tp=&arnumber=6405630>>, In Fourth International Conference on Multimedia Information Networking and Security, Nov. 2, 2012, pp. 59-63.

Shin, et al., "DFCloud: A TPM-based Secure Data Access Control Method of Cloud Storage in Mobile Devices", Retrieved at: <<http://ieeexplore.ieee.org/stamp/stamp.jsp?tp=&arnumber=6427606>>, In IEEE 4th International Conference on Cloud Computing Technology and Science, Dec. 3, 2012, pp. 551-556.

Chen, et al., "TPM-Performance Sensible Key Management Protocols for Service Provisioning in Cloud Computing", Retrieved at: <<http://link.springer.com/chapter/10.1007%2F978-3-642-22137-8_15#page-1>>, In Proceedings of the 16th International Conference on Security Protocols, Apr. 16, 2008, pp. 107-114.

Challener, et al., "A Practical Guide to Trusted Computing", Retrieved at: <<https://trusted-computing-project.googlecode.com/files/IBM.Press.A.Practical.Guide.To.Trusted.Computing.Jan.2008%281%29.pdf>>, In Proceeding of the IBM Press, Dec. 2007, 376 pages.

Goldman, Ken, "IBM's Software Trusted Platform Module", Retrieved at: <<http://sourceforge.net/projects/ibmswtpm/>>, Retrieved date: Nov. 19, 2013, 2 pages.

"The Chromium Projects", Retrieved at: <<http://www.chromium.org/developers/design-documents/tpm-usage>>, Retrieved date: Nov. 19, 2013, 5 pages.

Kotla, et al., "Pasture: Secure Offline Data Access Using Commodity Trusted Hardware", Retrieved at: <<http://research.microsoft.com/pubs/170840/osdi12-final-51.pdf>>, In Proceedings of the 10th USENIX Symposium on Operating Systems Design and Implementation, Oct. 2012, pp. 321-334.

Levin, et al., "TrInc: Small Trusted Hardware for Large Distributed Systems", Retrieved at: <<http://research.microsoft.com/pubs/78369/trinc_nsdi09.pdf>>, In Proceedings of the 6th USENIX Symposium on Networked Systems Design and Implementation, Apr. 2009, 14 pages.

Liu, et al., "Software Abstractions for Trusted Sensors", Retrieved at: <<http://research.microsoft.com/en-us/um/people/alecw/mobisys-2012.pdf>>, In Proceedings of the 10th International Conference on Mobile Systems, Applications, and Services, Jun. 25, 2012, 14 pages.

"Help Protect Your Files With BitLocker", Retrieved at: <<http://windows.microsoft.com/en-us/windows-8/using-bitlocker-drive-encryption>>, Retrieved date: Nov. 19, 2013, 1 page.

"Understanding and Evaluating Virtual Smart Cards", Retrieved at: <<http://www.microsoft.com/en-us/download/details.aspx?id=29076>>, Retrieved date: Nov. 20, 2013, 2 pages.

Parno, et al., "Memoir: Practical State Continuity for Protected Modules", Retrieved at: <<http://research.microsoft.com/pubs/146020/memoir.pdf>>, In Proceedings of the IEEE Symposium on Security and Privacy, May 2011, 16 pages.

Ryan, Mark, "Introduction to the TPM 1.2", Retrieved at:<<http://www.cs.bham.ac.uk/~mdr/research/papers/pdf/08-intro-TPM.pdf>>, Mar. 23, 2009, pp. 1-16.

Santos, et al., "Trusted Language Runtime (TLR): Enabling Trusted Applications on Smartphones", Retrieved at: <<http://research.microsoft.com/pubs/157703/tlr.pdf>>, In Proceedings of the 12th Workshop on Mobile Computing Systems and Applications, Mar. 1, 2011, 6 pages.

Santos, et al., "Policy-Sealed Data: A New Abstraction for Building Trusted Cloud Services", Retrieved at: <<http://research.microsoft.com/pubs/197594/excalibur.pdf>>, In Proceedings of the 21st USENIX Security Symposium, Aug. 2012, pp. 1-14.

Schneider, et al., "Nexus Authorization Logic (NAL): Design Rationale and Applications", Retrieved at: <<http://dl.acm.org/citation.cfm?id=1952990>>, In Journal of ACM Transactions on Information and System Security, vol. 14, Issue 1, May 2011, pp. 8:1-8:28.

(56) References Cited

OTHER PUBLICATIONS

Sirer, et al., "Logical Attestation: An Authorization Architecture for Trustworthy Computing", Retrieved at: <<http://piki.org/patrick/nexus.pdf>>, In Proceedings of the Twenty-Third ACM Symposium on Operating Systems Principles, Oct. 23, 2011, pp. 249-264.

"TPM 2.0 Library Specification FAQ", Retrieved at: <<http://www.trustedcomputinggroup.org/resources/tpm_20_library_specification_faq>>, Retrieved date: Nov. 20, 2013, 3 pages.

"TPM Main Specification", Retrieved at: <<http://www.trustedcomputinggroup.org/resources/tpm_main_specification>>, Retrieved date: Nov. 20, 2013, 2 pages.

Danev, et al., "Enabling Secure VM-vTPM Migration in Private Clouds", Retrieved at: <<http://dl.acm.org/ft_gateway.cfm?id=2076759&ftid=1064282&dwn=1&CFID=381959463&CFTOKEN=56893046>>, In Proceedings of the 27th Annual Computer Security Applications Conference, Dec. 5, 2011, pp. 187-196.

Osborn, et al., "Trusted Platform Module Evolution", In John Hopkins APL Technical Digest, vol. 32, Issue 2, 2013, pp. 536-543.

"International Search Report & Written Opinion Received for PCT Application No. PCT/US2015/018988", dated Sep. 29, 2015, 24 Pages.

Aaraj, Najwa, "Analysis and Design of a Hardware/Software Trusted Platform Module for Embedded Systems", In Journal of ACM Transactions on Embedded Computing Systems, vol. 8 Issue 1, Dec. 2008, 31 Pages.

Criswell, et al., "Virtual Ghost: Protecting Applications from Hostile Operating Systems", In Proceedings of the ACM Sigplan Conference on Programming Language Design and Implementation, vol. 49, Issue 4, Feb. 24, 2014, pp. 81-96.

McKeen, et al., "Innovative Instructions and Software Model for Isolated Execution", In Proceedings of the 2nd International Workshop on Hardware and Architectural Support for Security and Privacy, Jan. 2013, pp. 1-8.

Namiluko, et al., "Towards Enhancing Web Application Security Using Trusted Execution", Retrieved at: <<https://web.archive.org/web/20130821100312/http://ceur-ws.org/Vol-1011/4.pdf>>, Published On Aug. 21, 2013, 9 Pages.

Yap, et al., "Threat Model of a Scenario Based on Trusted Platform Module 2.0 Specification", In Proceeding of CEUR Workshop, vol. 1011, 2013, 7 Pages.

"Response to the International Search Report & Written Opinion Received for PCT Application No. PCT/US2015/018988", Filed Date: Dec. 16, 2015, 10 Pages.

"Written Opinion of the International Preliminary Examining Authority for PCT Application No. PCT/US2015/018988", dated Feb. 24, 2016, 13 Pages.

"International Preliminary Report on Patentability for PCT Application No. PCT/US2015/018988", dated Jun. 17, 2016, 21 Pages.

"Restriction Requirement For U.S. Appl. No. 14/629,501", dated Mar. 18, 2016, 7 Pages.

"Response to the Restriction Requirement For U.S. Appl. No. 14/629,501", filed Mar. 22, 2016, 9 Pages.

"Office Action For U.S. Appl. No. 14/629,501", dated May 13, 2016, 22 Pages.

"Response to the Office Action For U.S. Appl. No. 14/629,501", filed Sep. 13, 2016, 20 Pages.

"Notice of Allowance and Fees Due For U.S. Appl. No. 14/629,501", dated Jan. 13, 2017, 16 Pages.

"Response to the Office Action For Chinese Patent Application No. 201580012404.5", Filed Date: Mar. 1, 2017, 13 Pages.

"Office Action Issued in Chinese Patent Application No. 201580012404.5", dated Mar. 5, 2019, 30 Pages.

* cited by examiner

SECURE HARDWARE FOR CROSS-DEVICE TRUSTED APPLICATIONS

CROSS-REFERENCE TO RELATED APPLICATION

This application is a divisional of U.S. Pat. No. 9,686,077, filed on Feb. 24, 2015, and entitled "SECURE HARDWARE FOR CROSS-DEVICE TRUSTED APPLICATIONS", which claims priority to U.S. Provisional Patent Application No. 61/949,211, filed on Mar. 6, 2014, and entitled "A CLOUD TRUSTED PLATFORM MODULE FOR CROSS-DEVICE TRUSTED APPLICATIONS", the entireties of which are incorporated herein by reference.

BACKGROUND

People are increasingly relying on more than one computing device. Accordingly, automatic synchronization of photos, videos, applications, data, and games across computing devices owned by a single user is becoming more prevalent. Meanwhile, computing devices are increasingly incorporating trusted computing hardware. For example, a Trusted Platform Module (TPM) can be incorporated in a computing device to prevent firmware rollback and to store and attest a user's data encryption keys.

Unfortunately, these two trends may be at odds. Conventional trusted computing hardware, such as a traditional TPM, does not provide good support for cross-device functionality. By design, such TPMs offer a hardware root-of-trust bound to a single, standalone device. TPMs come equipped with encryption keys whose private parts never leave the TPM hardware chip, reducing the possibility those keys may be compromised. The tension between single-device TPM guarantees and the need for cross-device sharing makes it difficult for trusted applications to cope with multi-device scenarios. Thus, current TPMs may be ill-suited for cross-device scenarios in trusted mobile applications because these TPMs hinder seamless sharing of data across multiple computing devices.

Moreover, traditional TPMs are often slow and inefficient. Minimum performance requirements for TPMs have not been set as part of the TPM specification (e.g., version 1.2 or version 2.0) available from the Trusted Computing Group (TCG). Performance handicaps of conventional TPMs typically limit use of such TPMs to scenarios that do not require fast or frequent operations. Performance of TPMs can be enhanced by building such TPMs with faster internal parts; however, inclusion of such parts increase the cost of the TPMs.

SUMMARY

Described herein is a computing device that includes secure hardware (e.g., a TPM, a secure processor of a processing platform that includes at least one disparate processor, protected memory that includes a software-based TPM, etc.). The secure hardware includes a shared secret. The shared secret is shared by the secure hardware and a server computing system. The shared secret is provisioned by the server computing system or a provisioning computing system of a party affiliated with the server computing system. The secure hardware further includes a cryptographic engine that can execute a cryptographic algorithm using the shared secret or a key generated from the shared secret. The cryptographic engine can execute the cryptographic algorithm to perform encryption, decryption, authentication, and/or attestation.

Moreover, the secure hardware can include a remote access control component that can generate a message for accessing a remote resource (e.g., remote storage, keys, computation, clock value, etc.) of the server computing system, where the message can be generated responsive to the secure hardware receiving a command. The cryptographic engine can encrypt the message for transmission to the server computing system. The message can be encrypted by the cryptographic engine using the shared secret or the key generated from the shared secret to generate an encrypted message. Moreover, the encrypted message can be configured to cause access to the remote resource of the server computing system.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
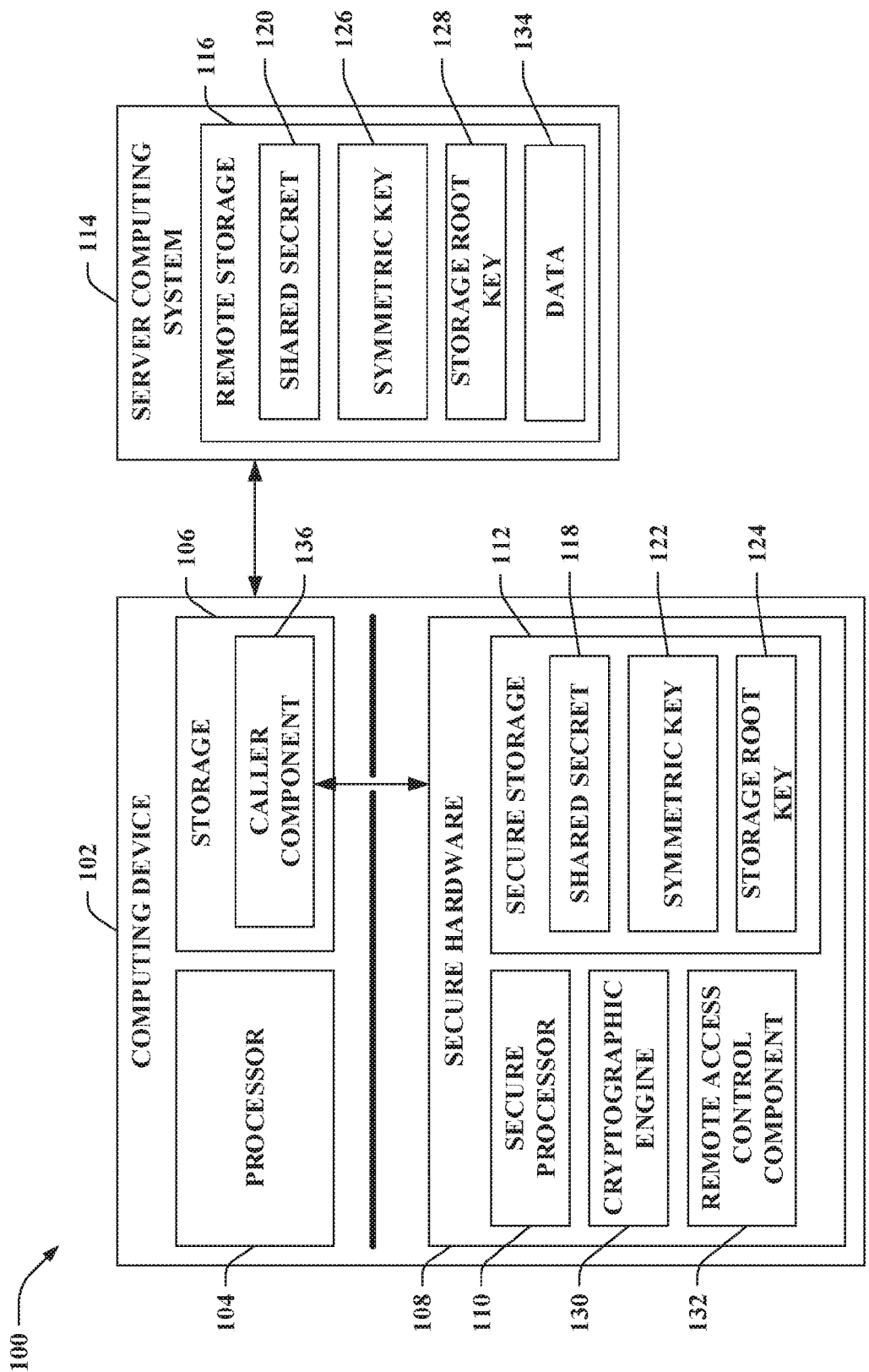
FIG. 1 illustrates a functional block diagram of an exemplary system that enables cross-device trusted computing.

Various technologies pertaining to enabling cross-device trusted computing using secure hardware, where the secure hardware is provisioned with a shared secret that is shared with a server computing system, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, secure hardware of a computing device is provisioned with a shared secret, which is shared with a server computing system. The shared secret can be used to enable trusted applications to overcome cross-device limitations that are typical of conventional secure hardware, such as conventional TPMs. The shared secret allows the server computing system to control a portion of resources of the secure hardware; those encrypted based on the shared secret. Further, the server computing system remains restricted from accessing other resources of the secure hardware protected by other, device local secrets. Moreover, the shared secret enables the secure hardware to access remote resources (e.g., remote storage, keys, computation, clock value, etc.) of the server computing system. The server computing system can provide a trusted, synchronized and accurate source of time by periodically recording the time to remote storage, which can be read by the secure hardware. In contrast, conventional secure hardware lacks a trusted source of time. Further, the remote storage of the server computing system offers larger amounts of remote storage (e.g., non-volatile storage, etc.) for trusted applications and allows more frequent writes to the remote storage as compared to storage of conventional secure hardware. Accordingly, the secure hardware and the server computing system described herein can mitigate resource and performance limitations typical of conventional secure hardware.

Referring now to the drawings, FIG. 1 illustrates a system 100 that enables cross-device trusted computing. The system 100 includes a computing device 102. The computing device 102 includes at least one processor 104 and computer-readable storage 106. The processor 104 is configured to execute instructions loaded into the storage 106. According to an example, the storage 106 can include an operating system (OS) of the computing device 102, one or more applications, and so forth; thus, the processor 104 can be configured to execute the OS, the one or more applications, etc.

The computing device 102 can be substantially any type of computing device. Examples of the computing device 102 include a desktop computing device, a server computing device, a mobile computing device (e.g., a laptop computing device, a netbook computing device, a mobile telephone, a tablet computing device, a wearable computing device, a handheld computing device, a portable gaming device, a personal digital assistant, etc.), a gaming console, an entertainment appliance, a set-top box, a television, an embedded computing device, a network device, an automotive computer, or the like.

The computing device 102 includes secure hardware 108 (e.g., the storage 106 is external to the secure hardware 108). The secure hardware 108 can include at least one secure processor 110. The secure processor 110 operates in a secure manner, shielded from access by or interference from sources external to the secure hardware 108. For instance, the secure processor 110 can be shielded from access by or interference from components or modules of the computing device 102 external to the secure hardware 108. According to other examples, however, it is contemplated that the secure hardware 108 need not include a secure processor; rather, time-based sharing of the processor 104 between the secure hardware 108 and an external world (e.g., external to the secure hardware, the storage 106) can be employed. Thus, it is contemplated that examples describing the secure hardware 108 including the secure processor 110 can be extended to an architecture where time-based sharing of the processor 104 is employed.

The secure hardware 108 also includes secure storage 112. The secure storage 112 is inaccessible by sources external to the secure hardware 108. Thus, the secure storage 112 is protected by and can be accessed by only particular functions or other components of or included in the secure hardware 108. For instance, the OS or an application executed by the processor 104 cannot read, write, or modify the secure storage 112. The secure storage 112 can include secure non-volatile (NV) storage and secure volatile storage.

The system 100 further includes a server computing system 114. The server computing system 114 can be or include one or more server computing devices. For instance, the server computing system 114 can be or include one or more datacenters, where a datacenter includes a plurality of server computing devices. One or more datacenters can alternatively include the server computing system 114. Further, the server computing system 114 can be a distributed computing system. According to an example, the server computing system 114 can be a cloud.

The server computing system 114 provides various remote resources for the secure hardware 108 of the computing device 102. For instance, the server computing system 114 can provide centralized data storage for the secure hardware 108 of the computing device 102. The server computing system 114 includes remote storage 116. Thus, the remote storage 116 is separate from the computing device 102. As described in greater detail herein, the secure hardware 108 of the computing device 102 can cause data to be written to the remote storage 116 of the server computing system 114 and/or cause data to be read from the remote storage 116 of the server computing system 114. The remote storage 116 can include a data structure that persistently stores data values.

The secure hardware 108 of the computing device 102 is provisioned with a shared secret 118. The secure storage 112 includes the shared secret 118. The secure hardware 108 is designed such that the shared secret 118 does not leave the secure hardware 108. Moreover, the shared secret 118 is shared with the server computing system 114. Accordingly, the remote storage 116 of the server computing system 114 includes a shared secret 120, which matches the shared secret 118 (e.g., the shared secret 118 and the shared secret 120 are identical). Moreover, the server computing system 114 protects the shared secret 120 from leaving the remote storage 116. For instance, secure hypervisors with a small Trusted Computing Base (TCB), narrow interfaces, or increased protection against cloud administrators can be used to protect the remote storage 116 of the server computing system 114 (e.g., to monitor and eliminate malware which could otherwise compromise the shared secret 120, etc.). The shared secret 118 and the shared secret 120 are collectively referred to herein as the shared secret 118-120.

The shared secret 118-120 shared by the secure hardware 108 and the server computing system 114 is provisioned by the server computing system 114 or a provisioning computing system of a party affiliated with the server computing system 114. The server computing system 114 can be provisioned with the shared secret 120 when the secure hardware 108 is provisioned with the shared secret 118. The secure hardware 108 can be provisioned with the shared secret 118 via a proprietary interface (e.g., the proprietary interface may be available only to a manufacturer of the secure hardware 108). According to an example, the secure hardware 108 and the server computing system 114 can be provisioned with the shared secret 118-120 during manufacturing of the secure hardware 108. Moreover, it is contemplated that the secure hardware 108 and the server computing system 114 can be issued a new shared secret via a secure rekeying mechanism (e.g., specialized hardware to perform secure rekeying, the provisioning computing system). By way of illustration, a user of the computing device 102 may take the computing device 102 to an establishment of an authorized entity (e.g., a party affiliated with the server computing system 114), such as a mobile operator store, where a staff member of the authorized entity has the specialized hardware and can perform the secure rekeying.

Various examples of provisioning the shared secret 118 of the secure hardware 108 are contemplated. Moreover, it is contemplated that a combination of the following examples can be employed to provision the shared secret 118 of the secure hardware 108. For example, the server computing system 114 or the provisioning computing system of the party affiliated with the server computing system 114 can provision the shared secret 118 of the secure hardware 108 by inserting the shared secret 118 into the secure hardware 108 before the secure hardware 108 is introduced for the first time into an unsecured environment (e.g., the shared secret 118 can be inserted into the secure hardware 108 during manufacturing). Such provisioning of the shared secret 118 into the secure hardware 108 can be a one-time operation, for example, where the secure hardware 108 is modified subsequent to the shared secret 118 being provisioned such that the secure hardware 108 is prohibited from later being reprovisioned. According to another example, the shared secret 118 can be provisioned (or reprovisioned) into the secure hardware 108 using specialized hardware; following this example, the secure hardware 108 can include a mechanism for authenticating the specialized hardware attempting to insert the shared secret 118 (e.g., the mechanism can evaluate whether to permit or deny the specialized hardware to insert the shared secret 118 in the secure hardware 108).

Moreover, according to an example, the shared secret 118-120 can further be shared by differing secure hardware of a differing computing device (e.g., the secure hardware 108, the differing secure hardware, and the server computing system 114 can share the shared secret 118-120. Following this example, the secure hardware 108, the differing secured hardware of the differing computing device, and the server computing system 114 can be provisioned with the shared secret 118-120 by the server computing system 114 or the provisioning computing system of the party affiliated with the server computing system 114.

According to an example, the shared secret 118-120 can be a shared primary seed. A shared primary seed is a random value that is permanently stored in the secure hardware 108 and the server computing system 114. However, it is contemplated that the secure hardware 108 can allow the shared primary seed (and secrets protected by the shared primary seed) to be cleared from the secure hardware 108 and the server computing system 114 (e.g., when a user prepares to discard the computing device 102); thus, secure rekeying can thereafter be performed. The shared primary seed is used by the secure hardware 108 and the server computing system 114 to generate symmetric/asymmetric keys and proofs for a cloud control domain.

The secure hardware 108 can use the shared secret 118 to generate a symmetric key 122 and a storage root key 124 (e.g., an asymmetric storage root key). The symmetric key 122 and the storage root key 124 are derived from the shared secret 118. Further, the symmetric key 122 and the storage root key 124 are stored in the secure storage 112. Likewise, the server computing system 114 can use the shared secret 120 to generate a symmetric key 126 and a storage root key 128. The symmetric key 126 and the storage root key 128 are stored in the remote storage 116 of the server computing system 114. A symmetric key is also referred to herein as a cloud communication key (CCK). Moreover, a storage root key generated based on the shared secret 118-120 is also referred to herein as a cloud root key (CRK).

Key derivations to generate the symmetric keys 122 and 126 occur twice: once by the secure hardware 108 and once by the server computing system 114. Similarly, key derivations to generate the storage root keys 124 and 128 occur twice: once by the secure hardware 108 and once by the server computing system 114. The key derivations are deterministic; thus, the secure hardware 108 and the server computing system 114 generate identical key copies (e.g., the symmetric key 122 and the symmetric key 126 are identical, the storage root key 124 and the storage root key 128 are identical). The secure hardware 108 can use a key derivation function (KDF) (e.g., SP800-108) and the shared secret 118 (e.g., the shared primary seed) to generate the symmetric key 122 and the storage root key 124, and the server computing system 114 can use the KDF and the shared secret 120 (e.g., the shared primary seed) to generate the symmetric key 126 and the storage root key 128.

The secure hardware 108 further includes a cryptographic engine 130 configured to execute a set of cryptographic algorithms. The cryptographic engine 130 can execute a cryptographic algorithm using the shared secret 118 or a key generated from the shared secret 118 (e.g., the symmetric key 122, the storage root key 124, a key generated from the storage root key 124, etc.). Further, the cryptographic engine 130 can execute the cryptographic algorithm to perform encryption, decryption, authentication, and/or attestation. According to an example, the secure storage 112 of the secure hardware 108 can include the cryptographic engine 130; following this example, the cryptographic engine 130 can be executable by the secure processor 110.

The secure hardware 108 also includes a remote access control component 132 that generates a message for accessing a remote resource (e.g., the remote storage 116, keys, computation, clock value, etc.) of the server computing system 114. The remote access control component 132 can generate the message responsive to the secure hardware 108 receiving a command. For instance, the remote storage 116 can be accessed to write, read, or modify data 134 stored in the remote storage 116. The secure storage 112 of the secure hardware 108, for instance, can include the remote access control component 132, and the remote access control component 132 can be executable by the secure processor 110.

According to an example, the message generated by the remote access control component 132 can include an indicator (e.g., an index, etc.) specifying the data 134 in the remote storage 116 to be read. By way of another example, the message generated by the remote access control component 132 can include data to be sent to the server computing system 114 for storing in the remote storage 116 (e.g., the data in the message generated by the remote access control component 132 can be stored by the server computing system 114 as the data 134).

The cryptographic engine 130 encrypts the message generated by the remote access control component 132 for transmission to the server computing system 114. The cryptographic engine 130 can encrypt the message using the shared secret 118 or a key generated from the shared secret 118 to generate an encrypted message. According to an example, the cryptographic engine 130 can encrypt the message using the symmetric key 122 to generate the encrypted message. The encrypted message is configured to cause access to the remote resource of the server computing system 114. The encrypted message, for instance, can be configured to cause access to the remote storage 116 of the server computing system 114 to read the data 134, to write data to the remote storage 116, to modify the data 134, etc.

The encrypted message can be transmitted by the computing device 102 to the server computing system 114. The server computing system 114 can decrypt the encrypted message using the shared secret 120 or a key generated from the shared secret 120. For example, the server computing system 114 can decrypt the encrypted message received from the computing device 102 using the symmetric key 126.

Further, the server computing system 114 can generate a reply message in response to the encrypted message generated by the secure hardware 108. The server computing system 114 can encrypt the reply message using the shared secret 120 or a key generated from the shared secret (e.g., the symmetric key 126) to generate an encrypted reply message. Moreover, the encrypted reply message can be transmitted by the server computing system 114 to the computing device 102. The encrypted reply message can be inputted to the secure hardware 108. The cryptographic engine 130 can decrypt the encrypted reply message using the shared secret 118 or a key generated from the shared secret 118 (e.g., the symmetric key 122).

Pursuant to an example, the encrypted message output by the cryptographic engine 130 can be configured to cause the server computing system 114 to write data to the remote storage 116 of the server computing system 114. Following this example, the encrypted message can include data from the secure storage 112 of the secure hardware 108 (e.g., such data can be non-persistently retained in the secure storage 112); the encrypted message can cause the data to be written as the data 134 in the remote storage 116 of the server computing system 114. It is contemplated that the data 134 stored in the remote storage 116 can be persistent data; however, the claimed subject matter is not so limited.

According to another example, the encrypted message output by the cryptographic engine 130 can be configured to cause the server computing system 114 to read the data 134 from the remote storage 116 of the server computing system 114. Following this example, the cryptographic engine 130 can decrypt an encrypted reply message to output the data 134, where the encrypted reply message is responsive to the encrypted message configured to cause the server computing system 114 to read the data 134 from the remote storage 116 (e.g., the reply message includes the data 134). Moreover, the secure storage 112 can locally store the data 134.

While the data 134 can be persistently stored in the remote storage 116, local caching in the secure storage 112 is not persistent; thus, the data 134 retrieved from the server computing system 114 is not persistently stored in the secure storage 112. The data 134 read from the remote storage 116 of the server computing system 114 and stored in the secure storage 112 can have a corresponding time-to-live (TTL) that specifies a maximum duration of time for locally caching the data 134 in the secure storage 112 of the secure hardware 108; accordingly, such locally cached data 134 can be deleted from the secure storage 112 after expiration of the TTL. According to another example, a decrementing counter rather than a TTL can be used to delete the locally cached data 134 from the secure storage 112 of the secure hardware 108.

It is contemplated that the secure hardware 108 may have previously caused the server computing system 114 to write the data 134 to the remote storage 116 of the server computing system 114; thereafter, the secure hardware 108 can cause the server computing system 114 to read the data 134. According to another example, differing secure hardware of a differing computing device may have caused the server computing system 114 to write the data 134 to the remote storage 116 of the server computing system 114 prior to the secure hardware 108 causing the data 134 to be read.

The storage 106 of the computing device 102 can include a caller component 136, and the caller component 136 can be executable by the processor 104. During operation of the computing device 102, the caller component 136 can send, to the secure hardware 108, a command that relies on access to data (e.g., persistent data) stored by the secure hardware 108 (e.g., data stored in the secure storage 112, data stored in the remote storage 116). Further, the caller component 136 can receive an encrypted message from the secure hardware 108 and transmit the encrypted message to the server computing system 114. The caller component 136 can also receive an encrypted reply message from the server computing system 114, send the encrypted reply message to the secure hardware 108, and receive a result from the secure hardware 108.

The caller component 136 can be implemented in various manners, such as being part of the OS of the computing device 102, being an application separate from the OS of the computing device 102 (or part of such application), or the like. The caller component 136 can send the command that relies on access to the data stored by the secure hardware 108 to request access to information stored in a hardware protected object. The information stored in the hardware protected object, for example, can be a cryptographic key. The caller component 136 can use the information in the hardware protected object in various manners, such as to verify permission to access other functionality of the computing device 102 (e.g., log into the computing device 102), to access (e.g., decrypt) encrypted data stored in the storage 106 of the computing device 102, to prove an identity of a user of the computing device 102 to a remote device or service (e.g., virtual smart card, etc.), and so forth. According to an example, the hardware protected object can be decrypted by the cryptographic engine 130 using the storage root key 124 (or a key derived from the storage root key 124).

Responsive to receipt of the command from the caller component 136, the secure hardware 108 can return a result if the data relied upon for the command is retained in the secure storage 112 of the secure hardware 108. Alternatively, if the data relied upon for the command is not retained in the secure storage 112 of the secure hardware 108 but is instead retained in the remote storage 116 of the server computing system 114, the remote access control component 132 of the secure hardware 108 can generate a message for accessing the remote storage 116 of the server computing system 114 and the cryptographic engine 130 can encrypt the message to generate an encrypted message. Thus, the secure hardware 108 can return the encrypted message to the caller component 136 responsive to receipt of such command. The caller component 136 sends the encrypted message to the server computing system 114, and, if accepted by the server computing system 114, receives an encrypted reply message from the server computing system 114. The caller component 136 provides the encrypted reply message to the secure hardware 108, and the secure hardware 108 can return a result to the caller component 136.

As noted above, it is contemplated that time-based sharing of the processor 104 between the secure hardware 108 and an external world (e.g., external to the secure hardware, the storage 106, Normal World) can be employed (e.g., rather than the secure hardware 108 including the secure processor 110). Thus, pursuant to an example, the caller component 136 can be executable by the processor 104 during a first set of time periods. Responsive to being executed by the processor 104 during the first set of time periods, the caller component 136 can send the command to the secure hardware 108, receive the encrypted message from the secure hardware 108, transmit the encrypted message to the server computing system 114, and so forth as described above. Moreover, the processor 104 can be prohibited from executing the caller component 136 (or other component(s) external to the secure hardware 108) during a second set of time periods, where the first set of time periods and the second set of time periods are non-overlapping. Following this example, the remote access control component 132 and the cryptographic engine 130 can be executable by the processor 104 during the second set of time periods. Further, the processor 104 can be prohibited from executing the remote access control component 132 and prohibited from executing the cryptographic engine 130 during the first set of time periods.

The shared secret 118-120 enables trusted applications to overcome cross-device limitations with assistance of the server computing system 114. Moreover, the secure hardware 108 can use the shared secret 118-120 to allocate the remote storage 116. The remote storage 116 can provide a larger amount of storage (e.g., NV storage) as compared to the secure storage 112 of the secure hardware 108. The remote storage 116 can also allow for more frequent writes (e.g., NV writes) as compared to the secure storage 112 of the secure hardware 108. Further, the remote storage 116 enables the server computing system 114 to provide a trusted, synchronized and accurate source of time by periodically recording the time to the remote storage 116; thus, the data 134 in the remote storage 116 can be or include a clock value (e.g., set by the server computing system 114 or a trusted source of time), which the secure hardware 108 can cause to be read and locally stored in the secure storage 112 of the secure hardware 108 as described herein.

According to an example, the server computing system 114 can manage a portion of a hardware protected state of the secure hardware 108. For instance, the server computing system 114 can perform operations that control server-side revocation.

Figure 2:
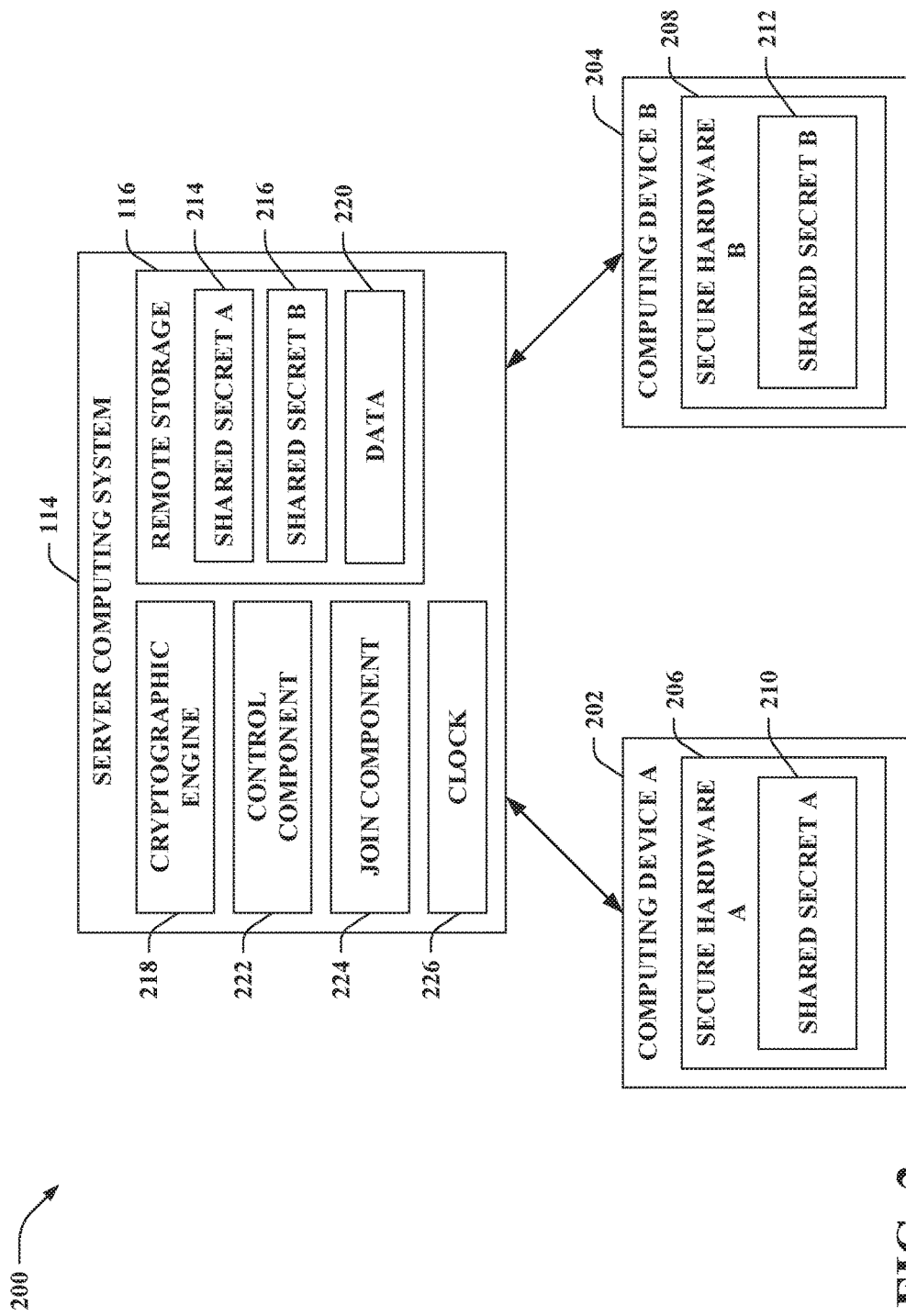
FIG. 2 illustrates a functional block diagram of an exemplary system that controls sharing of a hardware protected state across multiple computing devices.

With reference to FIG. 2, illustrated is a system 200 that controls sharing of a hardware protected state across multiple computing devices. The system 200 includes the server computing system 114, which further includes the remote storage 116. Additionally, the system 200 includes a computing device A 202 and a computing device B 204 (collectively referred to herein as computing devices 202-204). While not shown, it is contemplated that the system 200 can include substantially any number of computing devices in addition to the computing devices 202-204.

The computing devices 202-204 can each be substantially similar to the computing device 102. More particularly, the computing device A 202 includes secure hardware A 206 and the computing device B 204 includes secure hardware B 208, each of which can be substantially similar to the secure hardware 108. The secure hardware A 206 includes a shared secret A 210 that is shared with the server computing system 114, and the secure hardware B 208 includes a shared secret B 212 that is shared with the server computing system 114. Accordingly, the remote storage 116 of the server computing system 114 includes a shared secret A 214 (identical to the shared secret A 210) and a shared secret B 216 (identical to the shared secret B 212).

The server computing system 114 further includes a cryptographic engine 218. The cryptographic engine 218 can be substantially similar to the cryptographic engine 130 of the secure hardware 108. Although not shown, the secure hardware A 206 and the secure hardware B 208 each include a respective cryptographic engine substantially similar to the cryptographic engine 130.

The server computing system 114 can synchronize a hardware protected state between the computing device A 202 and the computing device B 204. The hardware protected state includes data (e.g., stored by the remote storage 116 of the server computing system 114 and secure storage of the computing devices 202-204). The hardware protected state can be synchronized based on encrypted messages communicated between the server computing system 114 and the computing device A 202 and encrypted messages communicated between the server computing system 114 and the computing device B 204. The encrypted messages communicated between the server computing system 114 and the computing device A 202 are encrypted (e.g., by the cryptographic engine 218 or the cryptographic engine of the secure hardware A 206) based on the shared secret A (e.g., using a symmetric key derived from the shared secret A); such encrypted messages are also decrypted (e.g., by the cryptographic engine 218 or the cryptographic engine of the secure hardware A 206) based on the shared secret A (e.g., using the symmetric key derived from the shared secret A). Moreover, the encrypted messages communicated between the server computing system 114 and the computing device B 204 are encrypted (e.g., by the cryptographic engine 218 or the cryptographic engine of the secure hardware B 208) based on the shared secret B (e.g., using a symmetric key derived from the shared secret B); these encrypted messages are also decrypted (e.g., by the cryptographic engine 218 or the cryptographic engine of the secure hardware B 208) based on the shared secret B (e.g., using the symmetric key derived from the shared secret B).

According to an example, the server computing system 114 can perform the following as part of synchronizing the hardware protected state between the computing device A 202 and the computing device B 204. Data 220 (e.g., the data 134) can be stored in the remote storage 116 of the server computing system 114. The data 220 may have been written responsive to a received encrypted message from one of the computing devices 202-204. Alternatively, a control component 222 of the server computing system 114 may have written the data 220 to the remote storage 116. The cryptographic engine 218 can encrypt a first message for the secure hardware A 206, where the first message includes the data 220. The first message can be encrypted by the cryptographic engine 218 based on the shared secret A 214 to generate a first encrypted message. Further, the server computing system 114 can transmit the first encrypted message to the computing device A 202. Moreover, the cryptographic engine 218 can encrypt a second message for the secure hardware B 208, where the second message includes the data 220. The second message can be encrypted by the cryptographic engine 218 based on the shared secret B 216 to generate a second encrypted message. The server computing system 114 can transmit the second encrypted message to the computing device B 204.

Moreover, subsequent to the server computing system 114 transmitting an encrypted message to a computing device (e.g., transmitting the first encrypted message to the computing device A 202 or transmitting the second encrypted message to the computing device B 204 in the aforementioned example), the data 220 in the remote storage 116 of the server computing system 114 may be modified. For instance, the data 220 may be modified responsive to a received encrypted message from one of the computing devices 202-204 or by control component 222 of the server computing system 114. Thereafter, the cryptographic engine 218 can encrypt a subsequent message for the secure hardware A 206, where the subsequent message includes the data 220 as modified. The subsequent message can be encrypted by the cryptographic engine 218 based on the shared secret A 214 to generate a subsequent encrypted message. The subsequent encrypted message can be transmitted by the server computing system 114 to the computing device A 202. Additionally or alternatively, a subsequent message for the secure hardware B 208 can similarly be encrypted and sent to the computing device B 204.

The server computing system 114 can further include a join component 224 that can identify computing devices (e.g., the computing devices 202-204) across which a particular hardware protection state is to be synchronized. For example, the cross-device synchronization of the hardware protected state can be across computing devices owned by the same user. Pursuant to another example, the cross-device synchronization of the hardware protected state can be across computing devices owned by a specified group of users.

According to an example, computing devices registered with a same user, such as the computing devices 202-204, can have their keys tied to the user's credentials. For instance, a shared key can be created across devices owned by the same user. By way of illustration, when "bob@xyz.com" calls the server computing system 114, a shared key can be automatically provisioned to the secure hardware on each of Bob's devices. This shared key can bootstrap various data sharing scenarios described herein.

Moreover, the server computing system 114 can include a clock 226 that can update a clock value (e.g., the data 220 can be or include the clock value). The clock 226 provides a real-time clock function. The clock 226 can read a local time upon initialization. Further, the clock 226 can use Network Time Protocol (NTP) to synchronize with a reference clock.

Further, the control component 222 can enable data to be controlled by the server computing system 114. For instance, the control component 222 can modify the data 220 to cause revocation of access to content. Thus, server-side revocation can be supported by the system 200. In contrast, server-side revocation using a conventional TPM would be difficult at best since a client would have to agree to run code that would allow for such revocation (e.g., refusing to run such code could prevent a server from causing the revocation).

Figure 3:
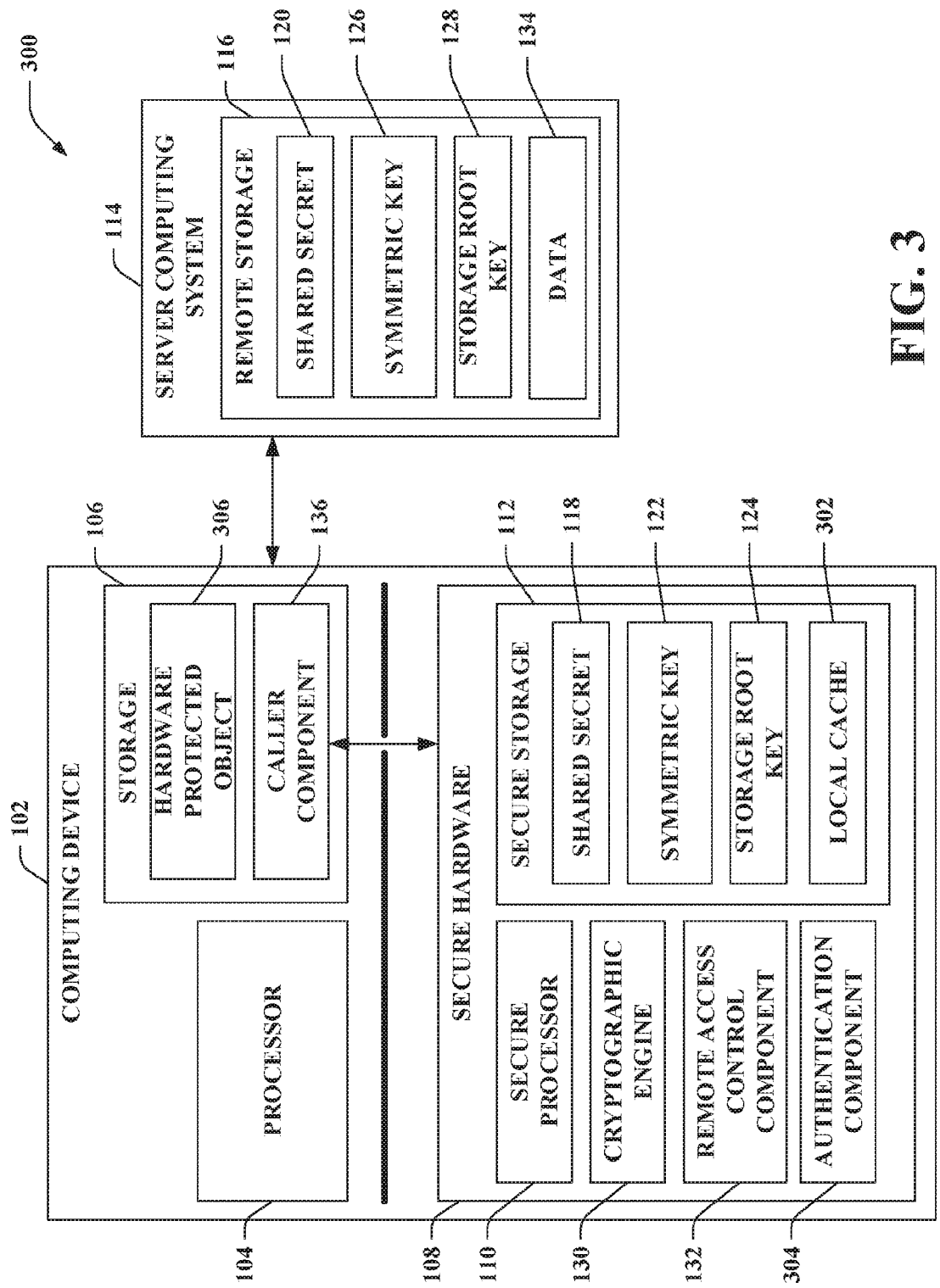
FIG. 3 illustrates a functional block diagram of an exemplary system that centrally stores data in remote storage of a server computing system and locally stores such data on a computing device.

With reference to FIG. 3, illustrated is a system 300 that centrally stores data (e.g., the data 134) in the remote storage 116 of the server computing system 114 and locally stores such data on the computing device 102. Again, the system 300 includes the computing device 102 and the server computing system 114. The computing device 102 further includes the secure hardware 108, which can include the secure processor 110 and the secure storage 112. The secure storage 112 includes the shared secret 118. The secure storage 112 can also include the symmetric key 122 and the storage root key 124.

The secure storage 112 further includes a local cache 302. The local cache 302, for instance, can be secure volatile storage (e.g., random-access memory (RAM)). The local cache 302 can retain a copy of data (e.g., the data 134) stored in the remote storage 116. Moreover, the local cache 302 can include data to be written to the remote storage 116.

Data in the local cache 302 can be employed by an authentication component 304 of the secure hardware 108 to determine whether to enable or prohibit access to information in a hardware protected object 306. For instance, the hardware protected object 306 can include a cryptographic key. The hardware protected object 306 can be stored in the storage 106 of the computing device 102; however, according to another example, it is contemplated that the secure storage 112 can additionally or alternatively include the hardware protected object 306. When permitted by the authentication component 304, the cryptographic engine 130 can decrypt a hardware protected object 306 received by the secure hardware 108 (e.g., using the storage root key 124). According to an example, the hardware protected object 306 may have been encrypted by the server computing system 114; yet, the claimed subject matter is not so limited.

In order to enable the caller component 136 to access the information (e.g., the cryptographic key) included in the hardware protected object 306, the authentication component 304 can verify whether a condition (or conditions) specified in a policy is satisfied based on the data in the local cache 302 (e.g., the data 134 retrieved from the remote storage 116 of the server computing system 114). The policy corresponds to the hardware protected object 306. For example, the authentication component 304 can verify authentication information, monotonic counter values, clock values, a combination thereof, and so forth. The cryptographic engine 130 can be prohibited from decrypting the hardware protected object 306 when the condition is identified by the authentication component 304 as not being satisfied. Alternatively, if the authentication component 304 verifies that no condition is unsatisfied, then the cryptographic engine 130 can be permitted to decrypt the hardware protected object 306 using the storage root key 124.

According to an example, a data structure, called an NV index, can be used to store data values (e.g., the data 134) persistently to the remote storage 116 (e.g., remote NV storage). When a persistent object is referenced in a command (e.g., received by the secure hardware 108 from the caller component 136), the secure hardware 108 loads the object into the local cache 302. When allocating a new NV index, an application specifies an access control (read-only or read-write), type, and size for such NV index. According to an example, there can be four possible types of NV indexes: (1) ordinary, for storing data blobs, (2) counters, for storing secure monotonic counters, (3) bit-fields, which can be set individually, and (4) extend, which can be modified by using an extend operation similar to platform configuration registers (PCRs).

The remote storage 116 can be or include a key-value store, where keys of the key-value store are NV indices. As described in greater detail herein, the OS of the computing device 102 (e.g., the caller component 136) can assist with communication between the secure hardware 108 and the server computing system 114. According to an example, operations employed to access the key-value store of the remote storage 116 can be asynchronous.

Remote NV entries can be cached locally in the local cache 302. To do so, a TTL can be included as part of remote NV entries. The TTL specifies a duration of time (e.g., in seconds) the secure hardware 108 can cache an NV entry in the local cache 302. Once the TTL expires, the NV index is deleted from the local cache 302 and is re-loaded from the remote storage 116 with a fresh, up-to-date copy. The local cache 302 of the secure storage 112 is not persistent—it is fully erased each time the computing device 102 reboots. A synchronization timestamp (ST) can also be added to be set to the time the entry was last cached locally. If there is no cached entry of the NV index in the local cache 302, this timestamp can be null.

Benefits of local caching are performance and availability; remote NV read operations may not require a round-trip to the server computing system 114 if the entries can be read from the local cache 302 (thereby reducing latency and network bandwidth usage). This enables the reading of NV storage entries even when the computing device 102 is disconnected from the server computing system 114 as long as the TTL has not expired. The tradeoff is that locally cached entries could be stale. Server-side updates to an NV entry in the remote storage 116 are reflected locally only after the TTL expires. The TTL controls the tradeoff between performance and staleness for each NV index entry.

For writes, the caller component 136 can be relied upon to propagate data written to the local cache 302 to be written to the remote NV storage. Responsive to an NV write command received by the secure hardware 108 from the caller component 136, the secure hardware 108 can first update the local cache 302 based upon such command. Moreover, the secure hardware 108 can return an error code that indicates the write back to the NV storage is pending. The caller component 136 can initiate a write protocol to the remote storage 116. If the caller component 136 fails to complete the write back, the write remains volatile, and no guarantee about persistent is made.

Loss of connectivity between the secure hardware 108 and the server computing system 114 is transparent to the secure hardware 108 because network signaling and communication is done by the caller component 136 (e.g., the OS of the computing device 102). As described in greater detail herein, asynchronous commands can be used to access the data 134 in the remote storage 116. Due to the nature of the asynchronous commands (e.g., a two-step process), the secure hardware 108 maintains in-memory state between the steps (e.g., in the local cache 302). Such maintaining of the state introduces a potential for a resource allocation denial-of-service attack, where a malicious OS can issue many asynchronous commands that cause the local cache 302 of the secure hardware 108 to fill up. Additionally or alternatively, an attacker can launch a staleness attack, whereby artificial delays are introduced in the communication with the server computing system 114. To protect against the foregoing types of attacks, the secure hardware 108 can maintain a global route timeout (GRT) value. Whenever an asynchronous request is received by the secure hardware 108 from the caller component 136, the secure hardware 108 starts a timer set to the GRT. Additionally, to free up the local cache 302, the secure hardware 108 scans outstanding asynchronous commands and discards those whose timers have expired. A value of the GRT can be set by an owner of the secure hardware 108, for example. According to an illustration, a default value of the GRT can be 5 minutes; yet, it is contemplated that other default vales of the GRT are intended to fall within the scope of the hereto appended claims.

Moreover, the clock value is an NV entry (with a pre-assigned NV index) stored in the remote storage 116. Only the server computing system 114 can update a clock NV entry. The secure hardware 108 can read the clock value by issuing an NV read command for the clock NV entry. Reading the clock NV entry is subject to a timeout, which can be stricter than the GRT, called the global clock timeout (GCT). The clock NV entry read from the server computing system 114 can be stored in the local cache 302 of the secure storage 112. In this way, the secure hardware 108 has access to the current time by adding a current timer tick count to the synchronization timestamp (ST) of the clock NV entry.

$$\text{maxClockError} \leq \text{TTL} \times \text{drift} + \text{GCT} \quad (1)$$

Equation (1) describes the upper bound of an accuracy of a local clock of the secure hardware 108 as a function of TTL, drift, and GCT. By default, the —can be set to 1 day and the global clock timeout (GCT) to 1 second, for example; yet, the claimed subject matter is not so limited. A low GCT improves local clock accuracy, but may lead to unavailability if the device-to-server computing system communication has high latency. The above-noted default values can be sufficiently accurate to support various mobile scenarios. An exemplary mobile scenario that can be supported is that the hardware protected object 306 can be permitted to be decrypted on Friday at midnight (e.g., to enable a movie to be released at that time). Setting the GCT lower than 1 second can further improve accuracy, while setting the TTL lower than 1 day can reduce the effect of drift.

Although connectivity loss can be masked by the OS of the computing device 102, the computing device 102 can be offline (e.g., disconnected from the server computing system 114) for extended periods of time. Under such scenario, the secure hardware 108 can be out of sync with the server computing system 114; yet, security concerns are not raised by such scenario. Instead, when long periods of disconnection occur, functionality of the secure hardware 108 can slowly degrade as entries in the local cache 302 become stale. When the computing device 102 reconnects with the server computing system 114, the hardware protected state of the secure hardware 108 can be resynchronized.

Various architectures of the secure hardware 108 are intended to fall within the scope of the hereto appended claim. Below, a few exemplary architectures are described; however, it is to be appreciated that other architectures of the secure hardware 108 fall within the scope of the appended claims. According to an exemplary architecture, the secure hardware 108 can be a physical TPM chip.

In another exemplary architecture, the secure hardware 108 can be or include protected memory of the computing device 102. Following this example, the protected memory can include a software-based TPM (e.g., the software-based TPM includes the shared secret 118, a TPM software stack, etc.). The protected memory is storage of the computing device 102 that cannot be read or modified by untrusted components of a Normal World. Normal operations can neither read nor write the data and functionality included within the protected memory. For example, the OS of the computing device 102 operates in the Normal World and cannot read or write the protected memory (e.g., the Secure World), which includes the software-based TPM. In accordance with an illustration, hardware (e.g., memory, a storage controller, etc.) can partition a region of storage for use by the Secure World only. Since the OS runs in the Normal World and not in the Secure World, the OS cannot access any memory marked as protected (e.g., the OS can send commands to the software-based TPM which operates in the Secure World).

According to yet another exemplary architecture, the computing device 102 can include a processing platform. The processing platform includes at least one processor (e.g., the processor 104) configured to execute the OS of the computing device 102. The processing platform further includes at least one secure processor (e.g., the secure processor 110) in communication with the at last one processor. Thus, the secure hardware 108 includes the secure processor(s). The secure processor(s) have access to the shared secret 118 (as well as the symmetric key 122 and the storage root key 124 if retained in the secure storage 112). The secure processor(s) can further execute various functions based on the shared secret 118 (e.g., encrypt, decrypt, attest, authenticate, etc.). Moreover, the at least one processor of the processing platform configured to execute the OS is prohibited from accessing the shared secret 118 (as well as from accessing the symmetric key 122 and the storage root key 124).

In accordance with another exemplary architecture, the secure hardware 108 can include a secure enclave on a processor. Following this example, the secure enclave can store and protect the shared secret 118 (as well as the symmetric key 122 and the storage root key 124, if retained) from sources external to the secure hardware 108.

FIGS. 4-9 below describe various examples in connection with the exemplary architecture where the secure hardware 108 is a physical TPM chip. It is to be appreciated that these examples can be extended to other architectures of the secure hardware 108.

Figure 4:
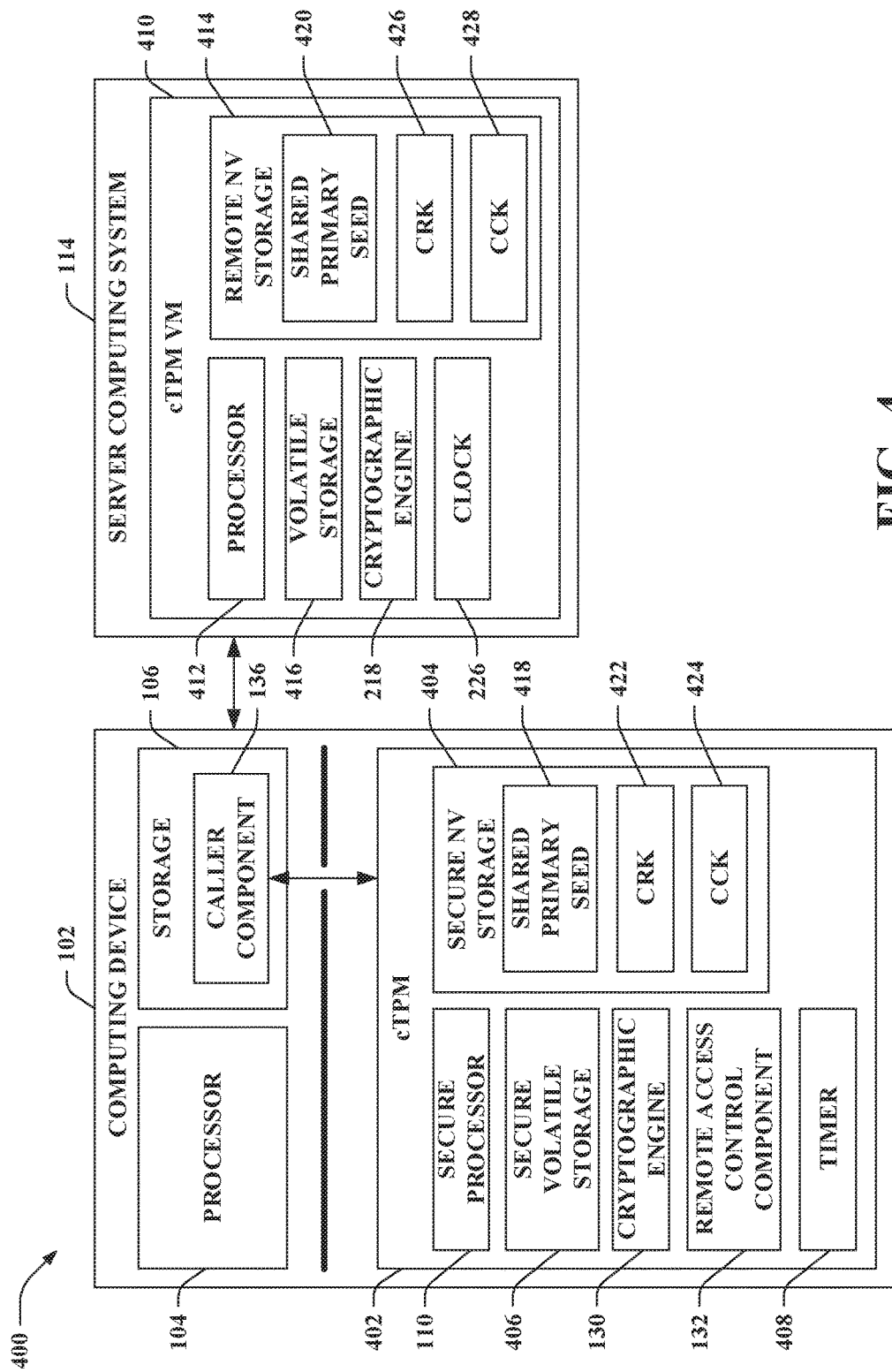
FIG. 4 illustrates a functional block diagram of an exemplary system that supports cross-device trusted applications.

Turning to FIG. 4, illustrated is a system 400 that supports cross-device trusted applications. The system 400 again includes the computing device 102 and the server computing system 114. In the example depicted in FIG. 4, the secure hardware 108 is a physical TPM chip, referred to herein as a cTPM 402; thus, the computing device 102 includes the cTPM 402. The cTPM 402 is equipped with a shared secret (e.g., the shared secret 118, a shared primary seed) that is shared with the server computing system 114. Although not shown, it is contemplated that the cTPM 402 can also be equipped with one or more other secrets (e.g., one or more primary seeds other than the shared primary seed) that are not shared with the server computing system 114.

The cTPM 402 includes the secure processor 110 and secure storage (e.g., the secure storage 112). The secure storage includes secure NV storage 404 and secure volatile storage 406 (e.g., random-access memory (RAM), the local cache 302). The secure volatile storage 406 can be or include a set of platform configuration registers (PCRs) guaranteed to be reset upon a reboot of the computing device 102. PCRs can be used to store fingerprints of a portion of software booting on the computing device 102 (e.g., the BIOS, firmware, and OS bootloader).

Moreover, the cTPM 402 includes the cryptographic engine 130, the remote access control component 132, and a timer 408. The cryptographic engine 130 is configured to execute various cryptographic algorithms. Examples of the cryptographic algorithms include SHA-1 (secure hash algorithm-1), SHA-2, RSA, and ECC (elliptic curve cryptography). For instance, version 1.2 of the TPM specification available from the TCG sets forth a set of cryptographic algorithms that includes SHA-1 and RSA, whereas version 2.0 of the TPM specification sets forth a set of cryptographic algorithms that includes SHA-1, SHA-2, RSA, and ECC. Accordingly, the cryptographic engine 130 can be configured to execute a set of cryptographic algorithms specified by a particular version of the TPM specification. Further, the timer 408 provides an internal trusted timer for the cTPM 402.

As depicted in the exemplary architecture of FIG. 4, the server computing system 114 includes a cTPM virtual machine (VM) 410 that runs on one or more physical devices of the server computing system 114. The cTPM VM 410 can include a processor 412 and remote storage (e.g., the remote storage 116). The remote storage can include remote NV storage 414 and volatile storage 416. According to another example, it is contemplated that the remote NV storage 414 can be separate from the cTPM VM 410. The cTPM VM 410 can also include the cryptographic engine 218 and the clock 226. The remote NV storage 414 can be cloud storage. Each computing device (e.g., each cTPM, the computing device A 202 and the computing device B 204) can be associated with a distinct cTPM VM.

Both the cTPM 402 and the cTPM VM 410 implement a TPM software stack with additional cTPM features. Accordingly, cloud operations (e.g., effectuated by the cTPM VM 410) made to the cTPM 402 follow TPM semantics, and thus, security properties of such operations need not be re-verified. On the device-side (e.g., the computing device 102), the cTPM software stack runs in secure hardware (e.g., a cTPM chip, etc.), whereas the server computing system 114 can run the cTPM software inside the cTPM VM 410. When running in the server computing system 114, cTPM resources (e.g., the remote NV storage 414, the volatile storage 416, the cryptographic engine 218, the clock 226) need not be encapsulated in hardware because the OS running in the cTPM VM 410 is assumed to be trusted. In contrast, the OS executed by the processor 104 of the computing device 102 is untrusted, and thus, secure hardware (e.g., the cTPM chip) is desirably able to offer these resources in isolation from the OS.

In the example set forth in FIG. 4, the shared secret (e.g., the shared secret 118 and the shared secret 120) is a shared primary seed, which is shared between the cTPM 402 and the server computing system 114. A shared primary seed is a random value that is permanently stored in the cTPM 402 and the server computing system 114 (the shared primary seed desirably does not leave the cTPM 402 and the server computing system 114). Thus, the secure NV storage 404 of the cTPM 402 can permanently store a shared primary seed 418 and the remote NV storage 414 of the server computing system 114 can permanently store a shared primary seed 420, where the shared primary seed 418 and the shared primary seed 420 match. The shared primary seeds 418 and 420 are respectively used by the cTPM 402 and the cTPM VM 410 to generate symmetric/asymmetric keys and proofs for a cloud control domain. Again, the shared primary seeds 418 and 420 are respectively used by the cTPM 402 and the cTPM VM 410 to generate asymmetric storage root keys (e.g., CRK 422 and CRK 426) and symmetric keys (e.g., CCK 424 and CCK 428).

Semantics of the CRK 422 and the CRK 426 can be substantially similar to semantics of a storage root key (SRK) for an owner control domain. The CRK 422 and the CRK 426 are respectively used by the cryptographic engine 130 and the cryptographic engine 218 to encrypt objects protected within the cloud control domain (similar to how SRK is used to encrypt objects within the owner control domain). The CCK 424 and CCK 428 are specific to the cloud control domain. The cryptographic engine 130 and the cryptographic engine 218 respectively use the CCK 424 and the CCK 428 to protect data exchanged between the cTPM 402 and the server computing system 114.

Figure 5:
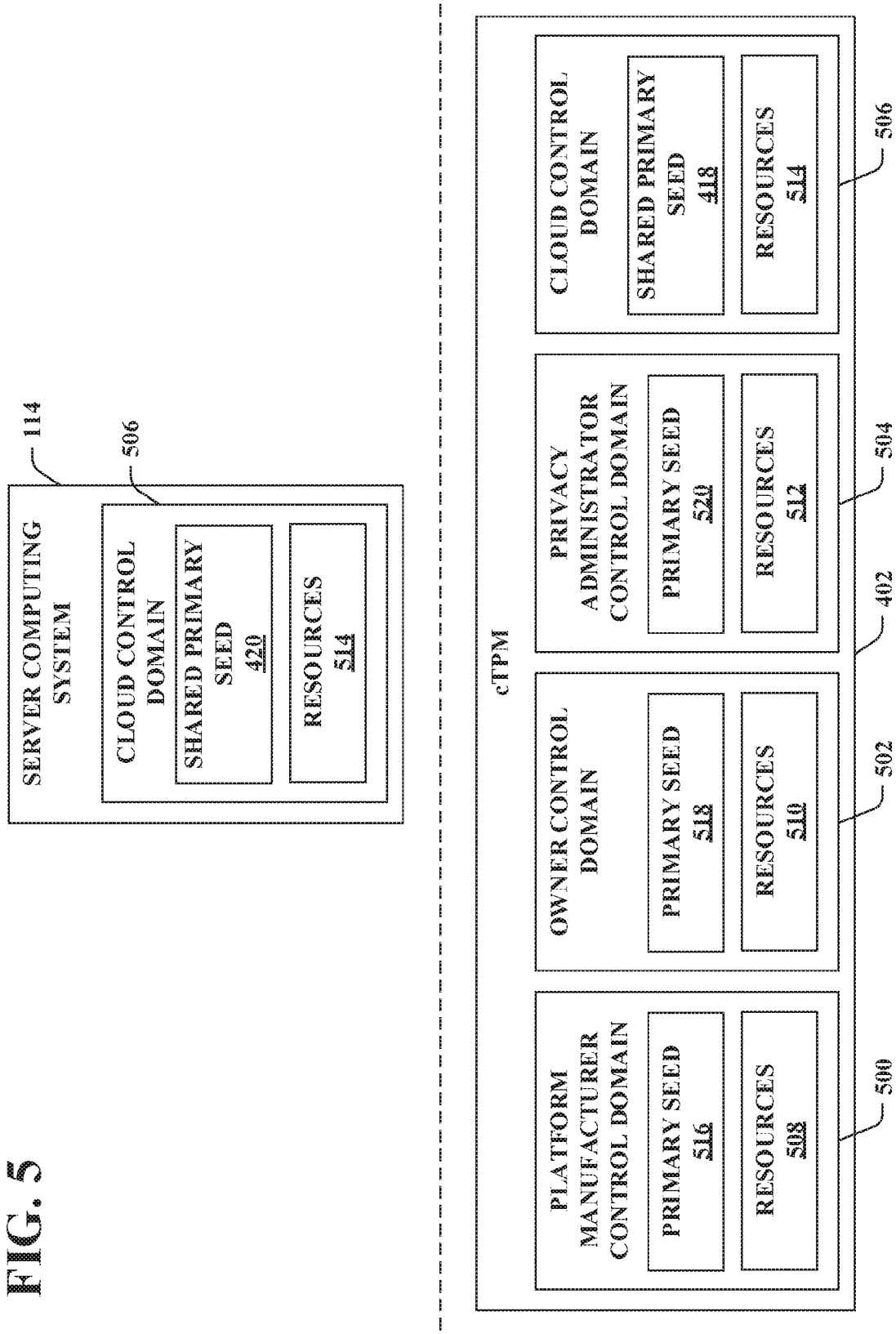
FIG. 5 illustrates exemplary control domains supported by a TPM of the exemplary system shown in FIG. 4.

FIG. 5 illustrates exemplary control domains supported by the cTPM 402. Differing entities can control different resources of the cTPM 402. A control domain (e.g., hierarchy) refers to specific resources that a given entity can control. According to the example shown in FIG. 5, the cTPM 402 can support four control domains: a platform manufacturer control domain 500, an owner control domain 502, a privacy administrator control domain 504, and a cloud control domain 506 (collectively referred to herein as control domains 500-506). However, it is contemplated that one or more of the aforementioned control domains (other than the cloud control domain 506) need not be supported by the cTPM 402. Moreover, it is to be appreciated that other control domain(s) in addition to the control domains 500-506 can be supported by the cTPM 402.

A platform manufacturer can control resources 508 as part of the platform manufacturer control domain 500. The platform manufacturer control domain 500 can update firmware of the cTPM 402. Moreover, an owner can control resources 510 as part of the owner control domain 502. The owner control domain 502 protects keys and data on behalf of users and applications. A privacy administrator can control resources 512 as part of the privacy administrator control domain 504. The privacy administrator control domain 504 safeguards privacy-sensitive data. The privacy administrator, for example, can be an IT department of an enterprise, where the IT department is the privacy administrator for TPMs (e.g., cTPMs) of computing devices of the enterprise. The owner can also control resources 514 as part of the cloud control domain 506. Similar to the owner control domain 502, the cloud control domain 506 protects keys and data on behalf of users and applications.

Each of the control domains 500-506 has a corresponding primary seed. A primary seed is used to generate symmetric/asymmetric keys and proofs for the corresponding control domain 500-506. Thus, the platform manufacturer control domain 500 has a primary seed 516, the owner control domain 502 has a primary seed 518, the privacy administrator control domain 504 has a primary seed 520, and the cloud control domain 506 has the shared primary seed 418-420. Each of the primary seeds is a large, random value. The primary seed 516, the primary seed 518, the primary seed 520, and the shared primary seed 418 are permanently stored in the cTPM 402 (e.g., in the secure NV storage 404). Moreover, the shared primary seed 420 is permanently stored in the server computing system 114 (e.g., in the remote NV storage 414). According to an example, at a time of manufacturing, the cTPM 402 can be provisioned with the primary seed 516, the primary seed 518, the primary seed 520, and the shared primary seed 418.

The cloud control domain 506 offers substantially similar functionality as the owner control domain 502 except that the shared primary seed 418-420 is shared between the cTPM 402 and the server computing system 114; in contrast, the primary seed 518 is not available outside the cTPM 402 (e.g., the server computing system 114 lacks access to the primary seed 518). Sharing the shared primary seed 418-420 between the cTPM 402 and the server computing system 114 allows both the cTPM 402 and the server computing system 114 to generate the same cloud root key (e.g., CRK 422 and CRK 426). Combining the cloud root key with remote storage of the server computing system 114 (e.g., the remote NV storage 414) enables enhanced sharing of data via the server computing system 114 as compared to conventional TPMs, provides access to a trusted real-time clock, and provides access to the remote NV storage 414. The remote NV storage 414 provides a larger quantity of storage for the cTPM 402 as compared to a quantity of storage typically provided by conventional TPMs and enables higher frequency writes as compared to conventional TPMs.

Conventional TPMs offer guarantees about a single computing device, with the hardware protection not extending across devices. For example, the owner control domain 502 can provide an isolation mechanism for only a single TPM. When a new owner takes ownership of the TPM, they cannot access the previous owner's TPM-protected secrets in the owner control domain 502. When the same user owns two different TPMs (on two different devices), the owner control domains of each TPM remains isolated and cannot jointly offer hardware-based protection of the user's keys and data. Thus, cross-device services are unable to rely on conventional TPMs (lacking the cloud control domain 506) alone to enable secure data sharing across devices.

According to an example, upon starting, the cTPM 402 can check whether the shared primary seed 418 is present. If not, the cTPM 402 can disable the cloud control domain 506 and commands associated with such domain 506.

By way of another example, if the server computing system 114 becomes compromised (e.g., the cloud control domain 506 becomes compromised), secrets protected by the platform manufacturer control domain 500, the owner control domain 502, and the privacy administrator control domain 504 would remain uncompromised. For instance, device-specific secrets protected in the owner control domain 502 would remain uncompromised in such situation. To recover from such compromise, the cTPM 402 and the server computing system 114 can be rekeyed with a new shared primary seed 418-420.

Figure 7:
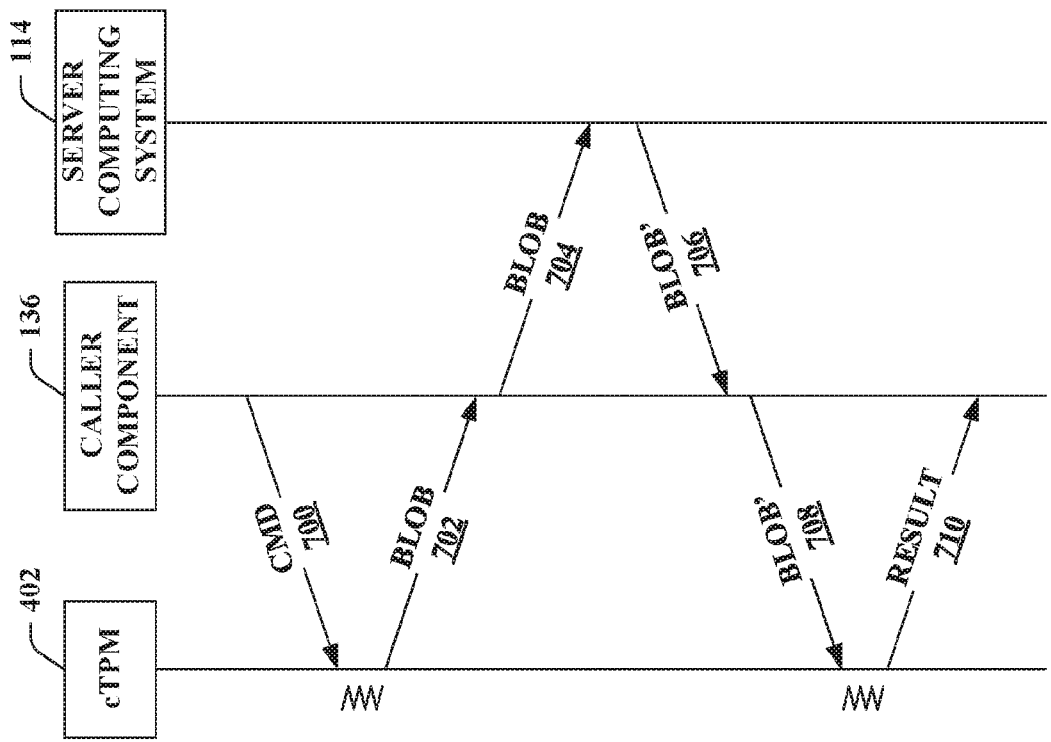
FIGS. 6-7 illustrate exemplary call flow diagrams for exchanging data responsive to commands issued by a caller component of a computing device to the TPM of the exemplary system shown in FIG. 4.
Figure 6:
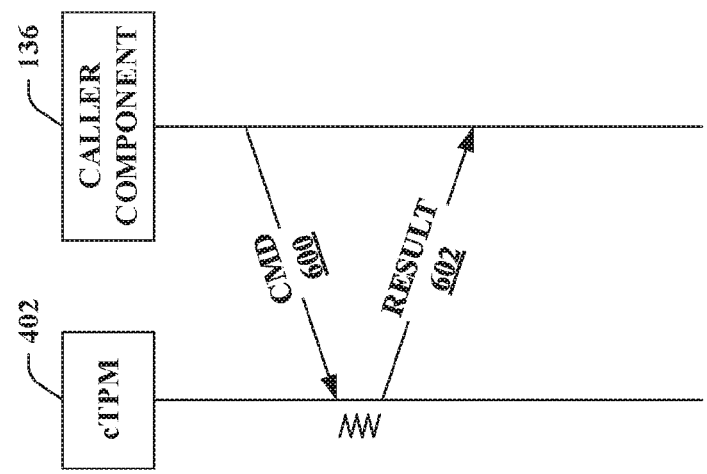

FIGS. 6 and 7 illustrate exemplary call flow diagrams for exchanging data responsive to commands issued by the caller component 136 to the cTPM 402. FIG. 6 depicts an exemplary scenario where the caller component 136 issues a command (cmd) that does not require access to the remote NV storage 414 of the server computing system 114. At 600, the caller component 136 sends the command to the cTPM 402. At 602, responsive to the command, the cTPM 402 sends a result to the caller component 136. When the command does not require access to the remote NV storage 414, communication between the cTPM 402 and the caller component 136 is synchronous. Thus, when such command arrives at the cTPM 402, the caller component 136 blocks and the cTPM 402 cannot process another command until the command terminates.

In contrast, FIG. 7 depicts an exemplary scenario where the caller component 136 issues a command (cmd) that requires the cTPM 402 to access the remote NV storage 414 of the server computing system 114. As depicted, the caller component 136 sends such command to the cTPM 402 at 700. The cTPM 402 cannot directly communicate with the server computing system 114. Instead, the cTPM 402 relies on the caller component 136 (e.g., the OS of the computing device 102) to communicate with the server computing system 114. Since the OS is untrusted, the cTPM 402 protects integrity and confidentiality of data exchanged between the cTPM 402 and the server computing system 114 (e.g., the remote NV storage 414) as well as protects against rollback attacks. The OS can be regarded as an insecure channel that forwards information to and from the server computing system 114.

In addition to ensuring security, asynchronous communication between the cTPM 402 and the server computing system 114 is employed when the command sent from the caller component 136 to the cTPM 402 requires access to the remote NV storage 414. At 702, responsive to receipt of the command that needs access to the remote NV storage 414, the cTPM 402 returns an encrypted message (e.g., an encrypted blob) to the caller component 136. The encrypted message can be encrypted by the cryptographic engine 130 using the CCK 424. At 704, the caller component 136 sends the encrypted message to the server computing system 114, and, if accepted by the server computing system 114, receives an encrypted reply message (e.g., a disparate encrypted blob in reply, blob') from the server computing system 114 at 706. At 708, the caller component 136 provides the encrypted reply message to the cTPM 402, and the cTPM 402 can return a result to the caller component 136 at 710. The cTPM 402 can remain responsive to other commands during this asynchronous communication with the server computing system 114.

Accordingly, communication between the cTPM 402 and the server computing system 114 is asynchronous. In contrast, conventional TPMs are single-threaded, and traditional TPM commands are synchronous (similar to the example shown in FIG. 6). However, making communication between the cTPM 402 and the server computing system 114 synchronous would lead to unacceptable performance. For example, consider the caller component 136 issuing a cTPM command that increments a counter in the remote NV storage 414. If communication were made synchronous, this command would make the cTPM 402 unresponsive and block until the increment update propagates to the server computing system 114 and the response returns to the cTPM 402.

An exemplary design and implementation of cTPM is now described. A description as to how TPM-protected keys (e.g., the hardware protected object 306) can be shared between the server computing system 114 and the computing device 102 is set forth, as well as changes made to support NV reads and writes. Also described is an exemplary cloud/device synchronization protocol, and TPM commands that can be added to implement synchronization.

Sharing of TPM-protected keys is now described. According to an example, the TPM 2.0 API facilitates sharing of TPM-protected keys by decoupling key creation from key usage. TPM2 Create( ), a TPM 2.0 command, creates a symmetric key or asymmetric key-pair. A TPM can create a key internally and encrypt any private (or symmetric) keys with its storage key before returning them to a caller. To use the key, a caller issues a TPM2 Load( ) command, which passes in the public storage key and the encrypted private (or symmetric) key. The TPM decrypts the private key and loads it in volatile storage. The TPM can then begin to encrypt or decrypt using the key.

The separation between create and load is due to the limited RAM available on a TPM chip. The separation between create and load also allows callers to create many keys without having to load them all into RAM. As long as the storage root key (SRK) never leaves the chip, encrypting the new keys' private parts with the SRK guarantees confidentiality of the keys. This separation enables the cTPM 402 to use cloud-created keys on the computing device 102. Accordingly, key sharing between devices becomes trivial. The server computing system 114 can perform a key sharing protocol between two cTPM VMs (e.g., the cTPM VM 410 and a disparate cTPM VM, each associated with a disparate computing device). Such key sharing protocol need not use a public key infrastructure (PKI), nor does it need to run in a secure execution mode (SEM). Once a shared key is created between two cTPM VMs, both computing devices can load the key in their chips separately by issuing TPM2_Load( ) commands. Moreover, key creation can be performed even when the computing device 102 is offline. Accordingly, a user can create shared keys across her devices without having to ensure those devices are online first.

Accessing remote NV storage 414 using the cTPM 402 is now described. The cTPM 402 maintains a local cache (e.g., the local cache 302, in the secure volatile storage 406) of reads and writes made to the remote NV storage 414. A read returns a cache entry, and a write updates a cache entry only. The cTPM 402 does not itself update the remote NV storage 414; instead, the caller component 136 synchronizes the on-chip local cache with the remote NV storage 414. This is done using a synchronization protocol.

Reading from the remote NV storage 414 is now described. Upon receiving an NV read command from the caller component 136, the corresponding NV entry is returned from the local cache. If not found, the cTPM 402 returns an error code. The caller component 136 can thereafter check the remote NV storage 414 by initiating a pull synchronization operation to update the local cache as described below. After synchronization completes, the caller component 136 reissues the read TPM command, which can be answered successfully from the local cache. Below is exemplary pseudo-code for reading a remote NV entry from the local cache.

1. NV_Read(NVIndex idx) {
2. // Garbage collect all local cache
3. for each nvIdx in LocalCache
4. if LocalCache[nvIdx].TTL is Expired
5. delete nvIdx from LocalCache
6. endif
7. end for each
8. // return NV entry if present
9. if idx in LocalCache return LocalCache[idx]
10. // return not found in cache
11. Return ErrorCode.NotFoundInCache
12.}

In the above pseudo-code, lines 3-6 describe garbage collection, where NV entries having expired TTLs are deleted from the local cache. At line 9, the NV entry is returned if found in the local cache. If the NV entry is not found in the local cache, then an error is returned at line 11.

Writing to the remote NV storage 414 is now described. An NV write command first updates the cache and returns an error code indicating that the write back to the remote NV storage 414 is pending. The caller component 136 initiates a push synchronization operation to the cloud NV as described below. If the caller component 136 fails to complete the write back, the write remains volatile, and the cTPM 402 makes no guarantees about its persistence. The following sets forth exemplary pseudo-code for writing an NV entry to the local cache.

```
1. NV Write(NVEntry entry) {
2. // Garbage collect all local cache
3. for each nvIdx in LocalCache
4. if LocalCache[nvIdx].TTL is Expired
5. delete nvIdx from LocalCache
6. end if
7. end for each
8. //Insert the entry in the cache
9. idx=LocalCache.Append(entry)
10. //Set the entry's TTL
11. LocalCache[idx].TTL=DefaultTTL
12.}
```

In the foregoing pseudo-code, lines 3-6 again describe garbage collection. At line 9, the NV entry is inserted in the local cache. At line 11, the TTL for the NV entry is set.

A synchronization protocol is now set forth. The synchronization protocol serves to: (1) update the local cache with entries from the remote NV storage 414 for NV reads; and (2) write updated cache entries back to the remote NV storage 414 for NV writes. On the computing device side, the caller component 136 performs the protocol using two commands, TPM2_Sync_Begin( ) and TPM2_Sync_End( ). These commands take a parameter called "direction," which can be set to either a "pull" or "push" to distinguish between reads and writes. Messages are encrypted with the CCK (e.g., the CCK 424, the CCK 428), a symmetric key.

Figure 8:
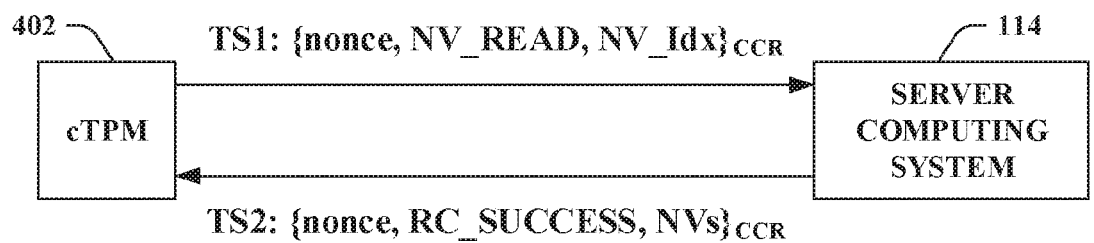
FIG. 8 illustrates an exemplary synchronization protocol when a non-volatile entry is pulled from remote non-volatile storage of a server computing system.

To pull from the remote NV storage 414, the cTPM 402 can record a value of its internal timer 408 (e.g., timestamp 1 (TS1)) and send a message that includes the requested NV index (e.g., NV_Idx) and a nonce. The nonce checks for freshness of the response and protects against replay attacks. Upon receipt, the server computing system 114 decrypts the message and checks its integrity. In response, the server computing system 114 sends back the nonce together with the value corresponding to the NV index requested (e.g., NVs). The cTPM 402 decrypts the message, checks its integrity, and verifies the nonce. If these checks are successful, the cTPM 402 performs a check to verify that a delay of the response did not exceed a global read timeout (GRT) value (e.g., based on TS2). If the foregoing checks pass, the cTPM 402 processes the read successfully. FIG. 8 illustrates an exemplary synchronization protocol when a non-volatile entry is pulled from the remote NV storage 414 of the server computing system 114. Depicted are exemplary messages exchanged between the cTPM 402 and the server computing system 114 to read an NV entry from the remote NV storage 414.

Pushing to the NV storage 414 is now described. The protocol for writing back an NV entry can handle the possibility that an attacker may try to reorder write operations. For example, a malicious OS or application can save an older write and attempt to reapply it later, effectively overwriting the up-to-date value. To overcome this, the protocol relies on a secure monotonic counter (ctr) maintained by the server computing system 114. Each write operation presents the current value of the counter to be applied; thus, stale writes cannot be replayed. The cTPM 402 can read the current value of the secure counter using the previously described pull protocol.

Figure 9:
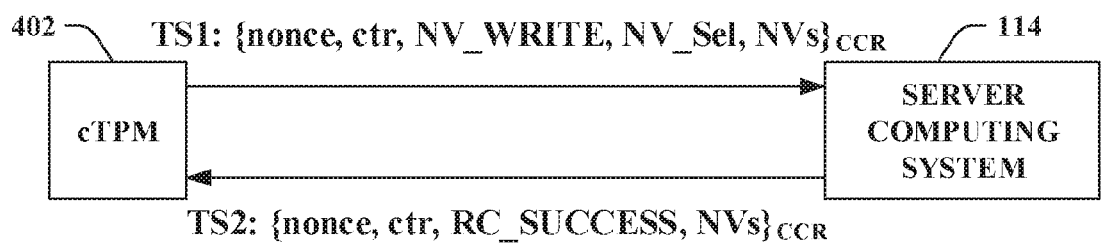
FIG. 9 illustrates an exemplary synchronization protocol when a non-volatile entry is pushed to remote non-volatile storage of a server computing system.

FIG. 9 illustrates an exemplary synchronization protocol when a non-volatile entry is pushed to the remote NV storage 414 of the server computing system 114. Shown are exemplary messages exchanged between the cTPM 402 and the server computing system 114 to write a remote NV entry to the remote NV storage 414. It is noted that reading the secure counter need not be done on each write because the cTPM 402 locally caches the up-to-date value in RAM. When the server computing system 114 receives an NV entry through the push synchronization protocol, it updates the remote NV storage 414. To do so, the cTPM 402 is equipped with a third command, called TPM2_Sync_Proc( ) (for process). This command can be issued only by the server computing system 114; the server computing system 114 takes the message received from the computing device 102 and calls sync process with it. The server computing system 114 decrypts the message and applies the NV update.

Figure 10:
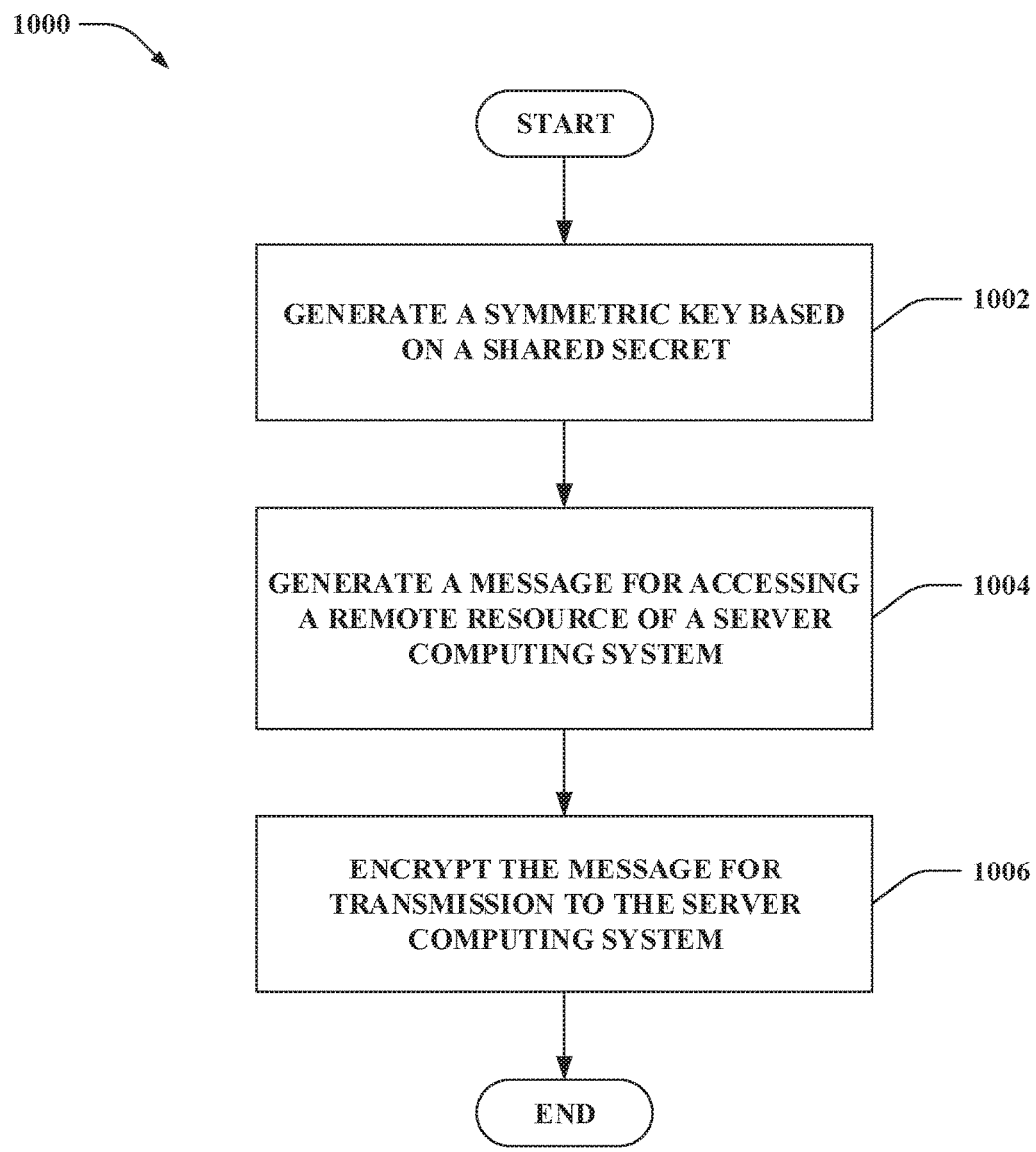
FIG. 10 is a flow diagram that illustrates an exemplary methodology for encrypting messages generated by secure hardware for transmission to a server computing system.
Figure 11:
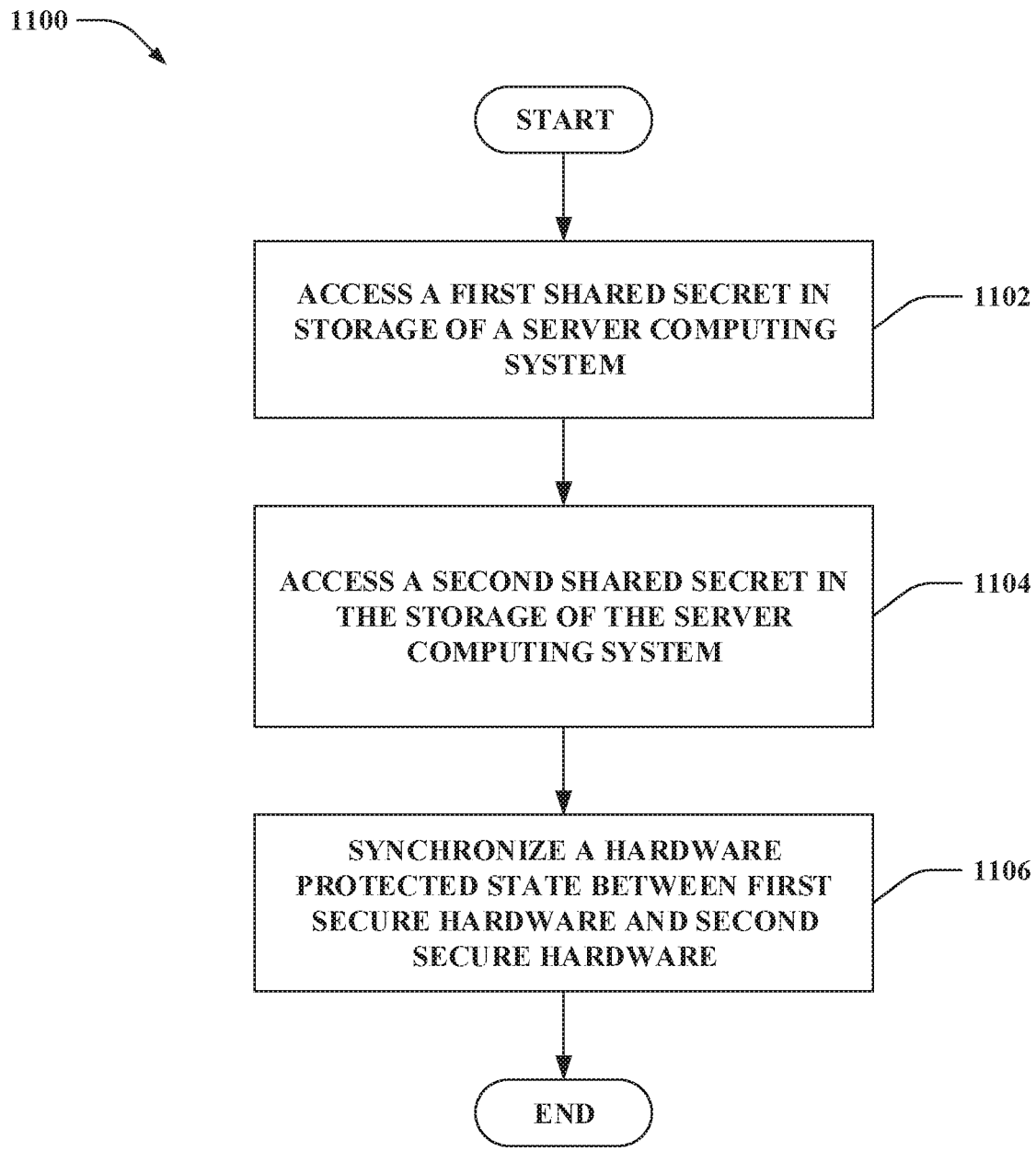
FIG. 11 is a flow diagram that illustrates an exemplary methodology for controlling sharing of a hardware protected state across multiple computing devices.

FIGS. 10-11 illustrate exemplary methodologies for enabling cross-device trusted computing using secure hardware, where the secure hardware is provisioned with a shared secret that is shared with a server computing system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 10 illustrates a methodology 1000 for encrypting messages generated by secure hardware for transmission to a server computing system. At 1002, a symmetric key can be generated by the secure hardware based on a shared secret. The shared secret is shared by the secure hardware and the server computing system. At 1004, a message for accessing a remote resource of the server computing system can be generated by the secure hardware. The message can be generated responsive to the secure hardware receiving a command. At 1006, the message can be encrypted for transmission to the server computing system. The message can be encrypted using the symmetric key to generate an encrypted message. Moreover, the encrypted message can be configured to cause access to the remote resource of the server computing system.

Now referring to FIG. 11, illustrated is a methodology 1100 for controlling sharing of a hardware protected state across multiple computing devices. At 1102, a first shared secret in storage of a server computing can be accessed. The first shared secret is shared by the server computing system and first secure hardware of a first computing device. At 1104, a second shared secret in the storage of the server computing system can be accessed. The second shared secret is shared by the server computing system and second secure hardware of a second computing device. At 1106, a hardware protected state can be synchronized between the first secure hardware and the second secure hardware. The hardware protected state can be synchronized based on first encrypted messages communicated between the server computing system and the first computing device, where the first encrypted messages are encrypted based on the first shared secret shared by the server computing system and the first secure hardware. Moreover, the hardware protected state can be synchronized based on second encrypted messages communicated between the server computing system and the second computing device, where the second encrypted messages are encrypted based on the second shared secret shared by the server computing system and the second secure hardware.

Figure 12:
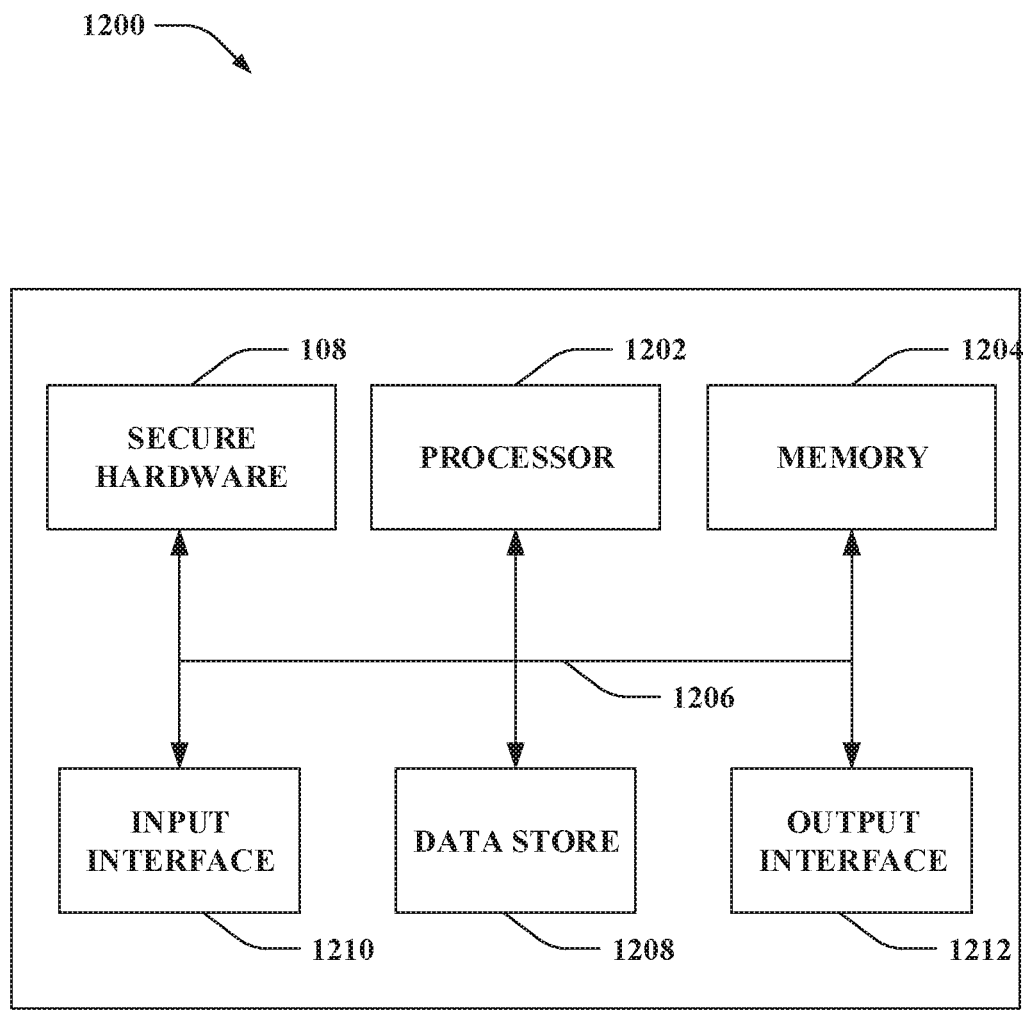
FIG. 12 illustrates an exemplary computing device.

Referring now to FIG. 12, a high-level illustration of an exemplary computing device 1200 that can be used in accordance with the systems and methodologies disclosed herein is illustrated. For instance, the computing device 1200 may be the computing device 102, the computing device A 202, or the computing device B 204. The computing device 1200 includes at least one processor 1202 (e.g., the processor 104) that executes instructions that are stored in a memory 1204 (e.g., the storage 106). The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store locally stored data, hardware protected objects, and so forth.

The computing device 1200 additionally includes a data store 1208 (e.g., the storage 106) that is accessible by the processor 1202 by way of the system bus 1206. The data store 1208 may include executable instructions, hardware protected objects, etc. Moreover, the computing device 1200 includes the secure hardware 108. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

Figure 13:
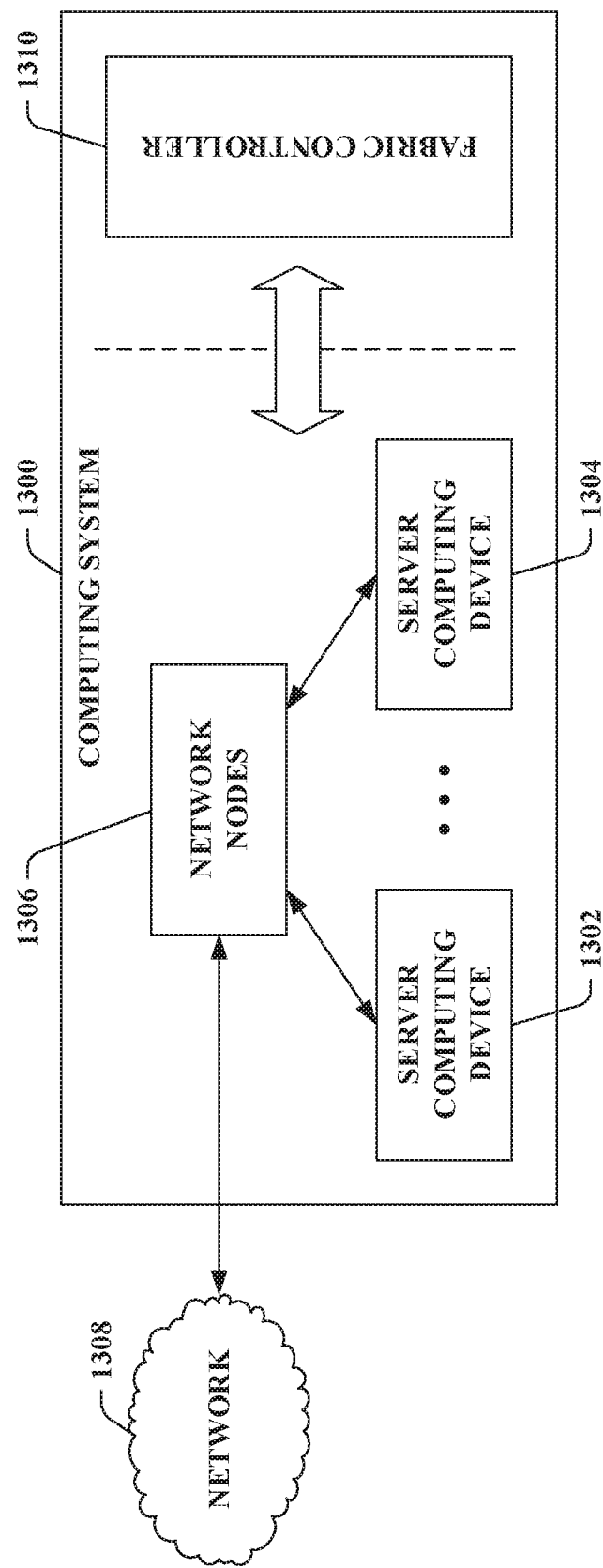
FIG. 13 illustrates an exemplary computing system.

Turning to FIG. 13, a high-level illustration of an exemplary computing system 1300 that can be used in accordance with the systems and methodologies disclosed herein is illustrated. For instance, the computing system 1300 can be or include the server computing system 114. Additionally or alternatively, the server computing system 114 can include the computing system 1300.

The computing system 1300 includes a plurality of server computing devices, namely, a server computing device 1302, . . . , and a server computing device 1304 (collectively referred to as server computing devices 1302-1304). The server computing device 1302 includes at least one processor and computer-readable storage; the at least one processor executes instructions that are stored in the storage. The instructions may be, for instance, instructions for implementing functionality described as being carried out by one or more components discussed above or instructions for implementing one or more of the methods described above. Similar to the server computing device 1302, at least a subset of the server computing devices 1302-1304 other than the server computing device 1302 each respectively include at least one processor and storage. Storage of one or more of the server computing devices 1302-1304 can be or include the remote storage 116, the volatile storage 416, and/or the remote NV storage 414.

The computing system 1300 further includes various network nodes 1306 that transport data between the server computing devices 1302-1304. Moreover, the network nodes 1302 transport data from the server computing devices 1302-1304 to external nodes (e.g., external to the computing system 1300) by way of a network 1308. The network nodes 1302 also transport data to the server computing devices 1302-1304 from the external nodes by way of the network 1308. The network 1308, for example, can be the Internet, a cellular network, or the like. The network nodes 1306 include switches, routers, load balancers, and so forth.

A fabric controller 1310 of the computing system 1300 manages hardware resources of the server computing devices 1302-1304 (e.g., processors, memories, data stores, etc. of the server computing devices 1302-1304). The fabric controller 1310 further manages the network nodes 1306. Moreover, the fabric controller 1310 manages creation, provisioning, de-provisioning, and supervising of virtual machines instantiated upon the server computing devices 1302-1304.

Various examples are now set forth.

Example 1

A computing device, comprising: secure hardware, comprising: a shared secret, the shared secret being shared by the secure hardware and a server computing system, the shared secret being provisioned by at least one of the server computing system or a provisioning computing system of a party affiliated with the server computing system; and a cryptographic engine that executes a cryptographic algorithm using at least one of the shared secret or a key generated from the shared secret, the cryptographic engine executes the cryptographic algorithm to perform at least one of encryption, decryption, authentication, or attestation.

Example 2

The computing device according to Example 1, the secure hardware further comprising: a remote access control component that generates a message for accessing a remote resource of the server computing system, the message generated responsive to the secure hardware receiving a command; and the cryptographic engine encrypts the message for transmission to the server computing system, the cryptographic engine encrypts the message using at least one of the shared secret or the key generated from the shared secret to generate an encrypted message, the encrypted message configured to cause access to the remote resource of the server computing system.

Example 3

The computing device according to Example 2, further comprising: at least one processor; and storage external to the secure hardware, the storage comprises a caller component, the caller component being executable by the at least one processor, the caller component sends the command to the secure hardware, receives the encrypted message from the secure hardware, and transmits the encrypted message to the server computing system; wherein the secure hardware comprises: at least one secure processor shielded from access by or interference from sources external to the secure hardware; and secure storage that is inaccessible by the sources external to the secure hardware.

Example 4

The computing device according to Example 2, further comprising: at least one processor; and storage external to the secure hardware, the storage comprises a caller component, wherein: the caller component is executable by the at least one processor during a first set of time periods; responsive to being executed by the at least one processor during the first set of time periods, the caller component sends the command to the secure hardware, receives the encrypted message from the secure hardware, and transmits the encrypted message to the server computing system; the at least one processor is prohibited from executing the caller component during a second set of time periods; and the first set of time periods and the second set of time periods are non-overlapping; and wherein the remote access control component and the cryptographic engine are executable by the at least one processor during the second set of time periods, and the at least one processor is prohibited from executing the remote access control component and prohibited from executing the cryptographic engine during the first set of time periods.

Example 5

The computing device according to any of Examples 1-4, the encrypted message configured to cause the server computing system to write data to remote storage of the server computing system.

Example 6

The computing device according to any of Examples 1-5, the encrypted message configured to cause the server computing system to read data from remote storage of the server computing system.

Example 7

The computing device according to any of Examples 1-6, the cryptographic engine decrypts an encrypted reply message using at least one of the shared secret or the key generated from the shared secret, the encrypted reply message being responsive to the encrypted message, the encrypted reply message decrypted to output the data; and the secure hardware further comprising: secure storage, the secure storage locally stores the data.

Example 8

The computing device according to any of Examples 1-7, wherein differing secure hardware of a differing computing device caused the server computing system to write the data to the remote storage of the server computing system.

Example 9

The computing device according to any of Examples 1-8, the encrypted message configured to retrieve a clock value from the server computing system.

Example 10

The computing device according to any of Examples 1-9, the shared secret further being shared by differing secure hardware of a differing computing device; wherein the secure hardware, the differing secure hardware of the differing computing device, and the server computing system are provisioned with the shared secret by at least one of the server computing system or the provisioning computing system of the party affiliated with the server computing system.

Example 11

The computing device according to any of Examples 1-10, the secure hardware further comprising: an authentication component that verifies whether a condition specified in a policy is satisfied based on data retrieved from the server computing system, the policy corresponds to a hardware protected object received by the secure hardware; wherein the cryptographic engine decrypts the hardware protected object using at least one of the shared secret or the key generated from the shared secret when the condition is identified as being satisfied, and the cryptographic engine is prohibited from decrypting the hardware protected object when the condition is identified as not being satisfied.

Example 12

The computing device according to any of Examples 1-11, the secure hardware being a physical Trusted Platform Module (TPM) chip.

Example 13

The computing device according to any of Examples 1-11, further comprising: a processing platform, comprising: at least one processor configured to execute an operating system of the computing device; and at least one secure processor in communication with the at least one processor, wherein the secure hardware comprises the at least one secure processor, and the at least one secure processor has access to the shared secret; wherein the at least one processor is prohibited from accessing the shared secret.

Example 14

The computing device according to any of Examples 1-11, the secure hardware comprising: protected memory of the computing device, the protected memory comprising: a software-based Trusted Platform Module (TPM), the software-based TPM comprising the shared secret and the cryptographic engine.

Example 15

The computing device according to any of Examples 1-11, the secure hardware comprising: a secure enclave on a processor, the secure enclave stores the shared secret and protects the shared secret from sources external to the secure hardware.

Example 16

A method for controlling sharing of a hardware protected state across multiple computing devices, comprising: accessing a first shared secret in storage of a server computing system, the first shared secret being shared by the server computing system and first secure hardware of a first computing device; accessing a second shared secret in the storage of the server computing system, the second shared secret being shared by the server computing system and second secure hardware of a second computing device; and synchronizing the hardware protected state between the first secure hardware and the second secure hardware, the hardware protected state being synchronized based on: first encrypted messages communicated between the server computing system and the first computing device, the first encrypted messages being encrypted based on the first shared secret shared by the server computing system and the first secure hardware; and second encrypted messages communicated between the server computing system and the second computing device, the second encrypted messages being encrypted based on the second shared secret shared by the server computing system and the second secure hardware.

Example 17

The method according to Example 16, further comprising: storing data in the storage of the server computing system; encrypting a first message for the first secure hardware, the first message comprises the data, the first message encrypted based on the first shared secret to generate a first encrypted message; transmitting the first encrypted message to the first computing device; encrypting a second message for the second secure hardware, the second message comprises the data, the second message encrypted based on the second shared secret to generate a second encrypted message; and transmitting the second encrypted message to the second computing device.

Example 18

The method according to any of Examples 16-17, further comprising: storing data in the storage of the server computing system; encrypting a message for the first secure hardware, the message comprises the data, the message encrypted based on the first shared secret to generate an encrypted message; transmitting the encrypted message to the first computing device; modifying the data in the storage of the server computing system subsequent to transmitting the encrypted message to the first computing device; encrypting a subsequent message for the first secure hardware, the subsequent message comprises the data as modified, the subsequent message encrypted based on the first shared secret to generate a subsequent encrypted message; and transmitting the subsequent encrypted message to the first computing device.

Example 19

The method according to Example 18, wherein the data is a clock value.

Example 20

Secure hardware, comprising: a shared secret, the shared secret being shared by the secure hardware and a server computing system; a symmetric key generated by the secure hardware based on the shared secret; a remote access control component that generates a message for accessing remote storage of the server computing system, the message generated responsive to the secure hardware receiving a command; and a cryptographic engine that encrypts the message for transmission to the server computing system, the cryptographic engine encrypts the message using the symmetric key to generate an encrypted message, the encrypted message configured to cause the remote storage of the server computing system to one of: write data to the remote storage of the server computing system; or read the data from the remote storage of the server computing system.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method for controlling synchronizing of a hardware protected state across multiple computing devices, comprising:
    accessing a first shared secret in storage of a server computing system, the first shared secret being shared by the server computing system and first secure hardware of a first computing device;
    accessing a second shared secret in the storage of the server computing system, the second shared secret being shared by the server computing system and second secure hardware of a second computing device; and
    synchronizing the hardware protected state between the first secure hardware and the second secure hardware, the hardware protected state being synchronized based on:
        first encrypted messages communicated between the server computing system and the first computing device, the first encrypted messages being encrypted based on the first shared secret shared by the server computing system and the first secure hardware; and
        second encrypted messages communicated between the server computing system and the second computing device, the second encrypted messages being encrypted based on the second shared secret shared by the server computing system and the second secure hardware.

2. The method of claim 1, further comprising:
    storing data in the storage of the server computing system;
    encrypting a first message for the first secure hardware, the first message comprises the data, the first message encrypted based on the first shared secret to generate a first encrypted message;
    transmitting the first encrypted message to the first computing device;
    encrypting a second message for the second secure hardware, the second message comprises the data, the second message encrypted based on the second shared secret to generate a second encrypted message; and
    transmitting the second encrypted message to the second computing device.

3. The method of claim 1, further comprising:
    storing data in the storage of the server computing system;
    encrypting a message for the first secure hardware, the message comprises the data, the message encrypted based on the first shared secret to generate an encrypted message;
    transmitting the encrypted message to the first computing device;
    modifying the data in the storage of the server computing system subsequent to transmitting the encrypted message to the first computing device;
    encrypting a subsequent message for the first secure hardware, the subsequent message comprises the data as modified, the subsequent message encrypted based on the first shared secret to generate a subsequent encrypted message; and
    transmitting the subsequent encrypted message to the first computing device.

4. The method of claim 3, wherein the data is a clock value.

5. The method of claim 1, wherein the first shared secret and the second shared secret are provisioned by the server computing system.

6. The method of claim 1, wherein the first shared secret and the second shared secret are provisioned by a provisioning computing system of a party affiliated with the server computing system.

7. The method of claim 1, further comprising:
    identifying that the hardware protected state is to be synchronized between the first secure hardware of the first computing device and the second secure hardware of the second computing device.

8. The method of claim 7, wherein the first secure hardware of the first computing device and the second secure hardware of the second computing device are identified based on credentials of a user.

9. The method of claim 1, wherein the hardware protected state comprises clock values provided by the server computing system to the first secure hardware of the first computing device and the second secure hardware of the second computing device.

10. The method of claim 1, wherein the hardware protected state comprises data, the method further comprising:
    storing the data in the storage of the server computing system, wherein the data is synchronized between the first secure hardware and the second secure hardware.

11. The method of claim 10, further comprising:
    receiving an encrypted message from the first computing device, wherein the encrypted message comprises the data; and
    decrypting the encrypted message using at least one of the first shared secret or a key generated from the first shared secret to output the data;
    wherein the data is stored in the storage of the server computing system responsive to the decrypting of the encrypted message.

12. The method of claim 10, wherein the data is written to the storage of the server computing system by the server computing system.

13. A server computing system, comprising:
    at least one processor; and
    storage, comprising:
    a first shared secret, the first shared secret being shared by the server computing system and first secure hardware of a first computing device; and
    a second shared secret, the second shared secret being shared by the server computing system and second secure hardware of a second computing device;

wherein the storage further comprises computer-executable instructions that, when executed by the at least one processor, cause the at least one processor to perform acts including:
accessing the first shared secret;
accessing the second shared secret; and
synchronizing a hardware protected state between the first secure hardware and the second secure hardware using the first shared secret and the second shared secret, wherein the hardware protected state is synchronized based on:
first encrypted messages communication between the server computing system and the first computing device, the first encrypted messages being encrypted based on the first shared secret shared by the server computing system and the first secure hardware; and
second encrypted messages communicated between the server computing system and the second computing device, the second encrypted messages being encrypted based on the second shared secret shared by the server computing system and the second secure hardware.

14. The server computing system of claim 13, wherein the storage further comprises computer-executable instructions that, when executed by the at least one processor, cause the at least one processor to perform acts including:
storing data in the storage of the server computing system;
encrypting a first message for the first secure hardware, the first message comprises the data, the first message encrypted based on the first shared secret to generate a first encrypted message;
transmitting the first encrypted message to the first computing device;
encrypting a second message for the second secure hardware, the second message comprises the data, the second message encrypted based on the second shared secret to generate a second encrypted message; and
transmitting the second encrypted message to the second computing device.

15. The server computing system of claim 13, wherein the storage further comprises computer-executable instructions that, when executed by the at least one processor, cause the at least one processor to perform acts including:
storing data in the storage of the server computing system;
encrypting a message for the first secure hardware, the message comprises the data, the message encrypted based on the first shared secret to generate an encrypted message;
transmitting the encrypted message to the first computing device;
modifying the data in the storage of the server computing system subsequent to transmitting the encrypted message to the first computing device;
encrypting a subsequent message for the first secure hardware, the subsequent message comprises the data as modified, the subsequent message encrypted based on the first shared secret to generate a subsequent encrypted message; and
transmitting the subsequent encrypted message to the first computing device.

16. The server computing system of claim 13, wherein the first shared secret and the second shared secret are provisioned by at least one of the server computing system or a provisioning computing system of a party affiliated with the server computing system.

17. The server computing system of claim 13, wherein the hardware protected state comprises clock values provided by the server computing system to the first secure hardware of the first computing device and the second secure hardware of the second computing device.

18. A server computing system, comprising:
at least one processor; and
storage, comprising:
data to be synchronized between first secure hardware of a first computing device and second secure hardware of a second computing device;
a first shared secret, the first shared secret being shared by the server computing system and the first secure hardware of the first computing device; and
a second shared secret, the second shared secret being shared by the server computing system and the second secure hardware of the second computing device;
wherein the storage further comprises computer-executable instructions that, when executed by the at least one processor, cause the at least one processor to perform acts including:
encrypting a first message for the first secure hardware, the first message comprises the data, the first message encrypted based on the first shared secret to generate a first encrypted message;
transmitting the first encrypted message to the first computing device;
encrypting a second message for the second secure hardware, the second message comprises the data, the second message encrypted based on the second shared secret to generate a second encrypted message; and
transmitting the second encrypted message to the second computing device.

19. The computing system of claim 18, wherein the first shared secret and the second shared secret are provisioned by at least one of the server computing system or a provisioning computing system of a party affiliated with the server computing system.

20. The server computing system of claim 18, wherein the data is a clock value.

* * * * *